(12) United States Patent
Sofuoglu et al.

(10) Patent No.: US 12,711,974 B2
(45) Date of Patent: Aug. 18, 2026

(54) METHOD, SYSTEM, AND COMPUTER PROGRAM PRODUCT FOR DYNAMICALLY IMPROVING VOICE QUALITY IN MOBILE CELLULAR COMMUNICATION NETWORK

(71) Applicant: P. I. Works U.S., Inc., Reston, VA (US)

(72) Inventors: Ahmet Serkan Sofuoglu, San Ramon, CA (US); Yakup Tarik Kranda, Reston, VA (US); Ubeyde Mavuş, Kartal (TR); Sina Alp, Maltepe (TR)

(73) Assignee: P.I. Works U.S., Inc., Reston, VA (US)

( * ) Notice: Subject to any disclaimer, the term of this patent is extended or adjusted under 35 U.S.C. 154(b) by 152 days.

(21) Appl. No.: 18/889,757

(22) Filed: Sep. 19, 2024

(65) Prior Publication Data

US 2026/0080884 A1 Mar. 19, 2026

(51) Int. Cl.
*H04M 3/22* (2006.01)
*G10L 19/24* (2013.01)

(52) U.S. Cl.
CPC .......... *G10L 19/24* (2013.01); *H04M 3/2236* (2013.01)

(58) Field of Classification Search
None
See application file for complete search history.

(56) References Cited

U.S. PATENT DOCUMENTS

2008/0274749 A1* 11/2008 Heo .................... H04L 1/1887 455/452.1
2023/0362733 A1* 11/2023 Di ........................ H04W 28/10

* cited by examiner

*Primary Examiner* — Quynh H Nguyen
(74) *Attorney, Agent, or Firm* — Intrinsic Law Corp.

(57) ABSTRACT

Voice data packets are analyzed to determine the audio codec mode and one or more data metrics associated with the voice data packets in a cellular voice call that includes a cellular mobile device in cellular communication with a base station. The audio codec mode and the data metric(s) is/are provided to a trained machine-learning model to determine a predicted mean-opinion score for the voice call. One or more network parameters are updated on the base station for the cellular user equipment device to improve the data metric(s) and the perceived quality of the cellular voice call.

14 Claims, 10 Drawing Sheets

| # | Time (mm:ss.000) | Nemo_AQDL_Timestamp | MOS_LQO_DL | RTP_Packet_Loss_Rate_DL | Nemo_RTP_DL_bytes | Nemo_RTP_DL_packets | Nemo_RTP_UL_bytes | Nemo_RTP_UL_packets | RTP_IPDV_DL(max) | LTE_UE_RSRP | LTE_UE_RSRQ | LTE_UE_SINR | LTE_UE_WideBand_CQI_Average | LTE_UE_EARFCN_DL |
|---|---|---|---|---|---|---|---|---|---|---|---|---|---|---|
| 1 | 04:02.561 | | | 0 | 295 | 7 | 57 | 3 | 160 | | | | | |
| 2 | 04:03.086 | | | 0 | 1260 | 18 | 57 | 3 | 160 | | | | | |
| 3 | 04:03.468 | | | | | | | | | -95 | -18 | -2 | 8.00 | 1651 |
| 4 | 04:03.591 | | | 0 | 1679 | 23 | 76 | 4 | 40 | | | | | |
| 5 | 04:04.175 | | | 0 | 2190 | 30 | 57 | 3 | 40 | | | | | |
| 6 | 04:04.468 | | | | | | | | | -93 | -18 | -3 | 7.33 | 1651 |
| 7 | 04:04.684 | | | 0 | 1971 | 27 | 57 | 3 | 45 | | | | | |
| 8 | 04:05.190 | | | 0 | 1206 | 18 | 76 | 4 | 85 | | | | | 1651 |
| 9 | 04:05.470 | | | | | | | | | -87 | -13 | 2.5 | 4.00 | 1651 |
| 10 | 04:05.670 | | | 0 | 57 | 3 | 57 | 3 | 160 | | | | | |
| 11 | 04:06.185 | | | 0 | 1752 | 24 | 57 | 3 | 160 | | | | | |
| 12 | 04:06.470 | | | | | | | | | -94 | -19 | -0.5 | 8.00 | 1651 |
| 13 | 04:06.663 | | | 0 | 1679 | 23 | 57 | 3 | 40 | | | | | |
| 14 | 04:07.184 | | | 3.7 | 1898 | 26 | 57 | 3 | 79 | | | | | |
| 15 | 04:07.471 | | | | | | | | | -99 | -22 | -5.5 | 4.00 | 1651 |
| 16 | 04:07.750 | | | 5.6 | 1241 | 17 | 76 | 4 | 80 | | | | | 1651 |
| 17 | 04:08.170 | | | 0 | 1644 | 24 | 38 | 2 | 322 | | | | | |
| 18 | 04:08.471 | | | | | | | | | -93 | -16 | -7 | 6.00 | 1651 |
| 19 | 04:08.551 | | | 0 | 57 | 3 | 57 | 3 | 200 | | | | | |
| 20 | 04:09.212 | | | 0 | 76 | 4 | 149 | 5 | 160 | | | | | |
| 21 | 04:09.471 | | | | | | | | | -94 | -15 | -3.5 | 8.67 | 1651 |
| 22 | 04:09.500 | 04:08.698 | 2.08 | | | | | | | | | | | |

FIG. 4

| | Collected information elements | | | | | | | | | Calculated information elements | | | | | |
|---|---|---|---|---|---|---|---|---|---|---|---|---|---|---|---|
| # | Time | Nemo_AQDL_Timestamp | MOS_LQO_DL | RTP_Packet_Loss_Rate(DL) | RTP_IPDV(DL) | Nemo_RTP_DL_bytes | Nemo_RTP_DL_packets | Nemo_RTP_UL_bytes | Nemo_RTP_UL_packets | RTP DL Byte Per Packet | RTP DL Packet SID | RTP DL Packet Speech | RTP UL Byte Per Packet | RTP UL Packet SID | RTP UL Packet Speech |
| 1 | 11:59:43.345 | | | 0.00 | 189.00 | 57.00 | 3.00 | 860.00 | 14.00 | 19.00 | 3.00 | 0.00 | 61.43 | 3.00 | 11.00 |
| 2 | 11:59:43.846 | | | 0.00 | 160.00 | 57.00 | 3.00 | 622.00 | 10.00 | 19.00 | 3.00 | 0.00 | 62.20 | 2.00 | 8.00 |
| 3 | 11:59:44.346 | | | 0.00 | 160.00 | 57.00 | 3.00 | 1825.00 | 25.00 | 19.00 | 3.00 | 0.00 | 73.00 | 0.00 | 25.00 |
| 4 | 11:59:44.846 | | | 0.00 | 161.00 | 57.00 | 3.00 | 1825.00 | 25.00 | 19.00 | 3.00 | 0.00 | 73.00 | 0.00 | 25.00 |
| 5 | 11:59:45.346 | | | 0.00 | 160.00 | 57.00 | 3.00 | 1825.00 | 25.00 | 19.00 | 3.00 | 0.00 | 73.00 | 0.00 | 25.00 |
| 6 | 11:59:45.846 | | | 0.00 | 170.00 | 57.00 | 3.00 | 1825.00 | 25.00 | 19.00 | 3.00 | 0.00 | 73.00 | 0.00 | 25.00 |
| 7 | 11:59:46.344 | | | 0.00 | 189.00 | 57.00 | 3.00 | 441.00 | 9.00 | 19.00 | 3.00 | 0.00 | 49.00 | 4.00 | 5.00 |
| 8 | 11:59:46.846 | | | 0.00 | 160.00 | 76.00 | 4.00 | 749.00 | 11.00 | 19.00 | 4.00 | 0.00 | 68.09 | 1.00 | 10.00 |
| 9 | 11:59:47.346 | | | 0.00 | 160.00 | 57.00 | 3.00 | 1825.00 | 25.00 | 19.00 | 3.00 | 0.00 | 73.00 | 0.00 | 25.00 |
| 10 | 11:59:47.846 | | | 0.00 | 161.00 | 57.00 | 3.00 | 1825.00 | 25.00 | 19.00 | 3.00 | 0.00 | 73.00 | 0.00 | 25.00 |
| 11 | 11:59:48.347 | | | 0.00 | 160.00 | 57.00 | 3.00 | 1825.00 | 25.00 | 19.00 | 3.00 | 0.00 | 73.00 | 0.00 | 25.00 |
| 12 | 11:59:48.846 | | | 0.00 | 160.00 | 57.00 | 3.00 | 1825.00 | 25.00 | 19.00 | 3.00 | 0.00 | 73.00 | 0.00 | 25.00 |
| 13 | 11:59:49.324 | | | 0.00 | 188.00 | 57.00 | 3.00 | 368.00 | 8.00 | 19.00 | 3.00 | 0.00 | 46.00 | 4.00 | 4.00 |
| 14 | 11:59:49.804 | | | 0.00 | 160.00 | 57.00 | 3.00 | 57.00 | 3.00 | 19.00 | 3.00 | 0.00 | 19.00 | 3.00 | 0.00 |
| 15 | 11:59:50.346 | | | 0.00 | 160.00 | 568.00 | 10.00 | 57.00 | 3.00 | 56.80 | 3.00 | 7.00 | 19.00 | 3.00 | 0.00 |
| 16 | 11:59:50.777 | | | 0.00 | 160.00 | 787.00 | 13.00 | 57.00 | 3.00 | 60.54 | 3.00 | 10.00 | 19.00 | 3.00 | 0.00 |
| 17 | 11:59:51.346 | | | 0.00 | 160.00 | 695.00 | 11.00 | 57.00 | 3.00 | 63.18 | 2.00 | 9.00 | 19.00 | 3.00 | 0.00 |
| 18 | 11:59:51.835 | | | 4.20 | 90.00 | 1679.00 | 23.00 | 57.00 | 3.00 | 73.00 | 0.00 | 23.00 | 19.00 | 3.00 | 0.00 |
| 19 | 11:59:52.355 | | | 0.00 | 48.00 | 1898.00 | 26.00 | 57.00 | 3.00 | 73.00 | 0.00 | 26.00 | 19.00 | 3.00 | 0.00 |
| 20 | 11:59:52.844 | | | 0.00 | 48.00 | 1752.00 | 24.00 | 76.00 | 4.00 | 73.00 | 0.00 | 24.00 | 19.00 | 4.00 | 0.00 |
| 21 | 11:59:53.337 | | | 0.00 | 56.00 | 1898.00 | 26.00 | 57.00 | 3.00 | 73.00 | 0.00 | 26.00 | 19.00 | 3.00 | 0.00 |
| 22 | 11:59:53.817 | | | 0.00 | 168.00 | 368.00 | 8.00 | 57.00 | 3.00 | 46.00 | 4.00 | 4.00 | 19.00 | 3.00 | 0.00 |
| 23 | 11:59:54.346 | | | 0.00 | 168.00 | 822.00 | 12.00 | 57.00 | 3.00 | 68.50 | 1.00 | 11.00 | 19.00 | 3.00 | 0.00 |
| 24 | 11:59:54.826 | | | 0.00 | 57.00 | 1752.00 | 24.00 | 57.00 | 3.00 | 73.00 | 0.00 | 24.00 | 19.00 | 3.00 | 0.00 |
| 25 | 11:59:55.346 | | | 0.00 | 50.00 | 1898.00 | 26.00 | 57.00 | 3.00 | 73.00 | 0.00 | 26.00 | 19.00 | 3.00 | 0.00 |
| 26 | 11:59:55.826 | | | 0.00 | 49.00 | 1752.00 | 24.00 | 57.00 | 3.00 | 73.00 | 0.00 | 24.00 | 19.00 | 3.00 | 0.00 |
| 27 | 11:59:56.346 | | | 0.00 | 48.00 | 1898.00 | 26.00 | 57.00 | 3.00 | 73.00 | 0.00 | 26.00 | 19.00 | 3.00 | 0.00 |
| 28 | 11:59:56.844 | | | 0.00 | 160.00 | 295.00 | 7.00 | 76.00 | 4.00 | 42.14 | 4.00 | 3.00 | 19.00 | 4.00 | 0.00 |
| 29 | 11:59:57.324 | | | 0.00 | 188.00 | 57.00 | 3.00 | 57.00 | 3.00 | 19.00 | 3.00 | 0.00 | 19.00 | 3.00 | 0.00 |
| 30 | 11:59:57.846 | | | 0.00 | 160.00 | 57.00 | 3.00 | 695.00 | 11.00 | 19.00 | 3.00 | 0.00 | 63.18 | 2.00 | 9.00 |
| 31 | 11:59:58.265 | | | 0.00 | 189.00 | 57.00 | 3.00 | 568.00 | 10.00 | 19.00 | 3.00 | 0.00 | 56.80 | 3.00 | 7.00 |
| 32 | 11:59:58.396 | 11:59:57.156 | 3.579 | | | | | | | | | | | | |

FIG. 6

METHOD, SYSTEM, AND COMPUTER PROGRAM PRODUCT FOR DYNAMICALLY IMPROVING VOICE QUALITY IN MOBILE CELLULAR COMMUNICATION NETWORK

TECHNICAL FIELD

This application relates generally to wireless communication networks.

BACKGROUND

Long-term Evolution (LTE) systems were initially designed to provide high bandwidth data services. At early stages, voice service was handled by legacy 3G or 2G systems until IP Multimedia Subsystem (IMS) networks were standardized for voice control over LTE networks. Various IMS-enabled Mobile Communication Systems (MCS) are deployed that provide voice services using voice codecs such as AMR NB (Adaptive Multi Rate Narrow Band), AMR WB (Adaptive Multi Rate Wide Band), EVS (Enhanced Voice Services), etc. Involvement of disparate/overlay networks (e.g. SIP (Session Initiation Protocol)) signaling plane and user data plane) for providing a packet-based voice service brings numerous challenges in terms of real-time voice quality assessment and dynamically configuring remedy actions on an MCS radio network. Existing methods for packet-based voice quality assessment over communication networks either use various simulations not reflecting real network situation or expensive packet inspection solutions not scalable to accurately determine and/or dynamically improve voice quality over a mobile communication network.

3GPP (3rd Generation Partnership Project) standards define a standardized way to carry voice packets over 3GPP cellular MCS networks. Bearer service for voice (i.e., QCI1/QCI=1 (Quality-of-Service Class (QoS) Identifier) for LTE and 5QI1/5QI=1 (5G QoS Identifier for New Radio (NR)) provides a mechanism within a 3GPP-standardized non-congested MCS network (composed of a core network, a radio network and an IMS network) to carry voice packets with an upper bound on packet loss and end-to-end delay but does not make any separation of frame types carried via QCI1/5QI1 bearer. These can include speech-only frames or silent indication frames and they may have similar share (e.g., 50% talk or listen) in time for a conversational voice due to similar talk and listen durations for caller and callee. Thus, when the MCS is heavily loaded with users of voice and/or data due to the packet-based nature of an MCS, QCI1 QoS characteristics in terms of packet loss and/or delay cannot be maintained with previously assigned network resources such as time share allocation type of physical resource block allocations (e.g., flexible scheduling or pre-allocated scheduling).

Under a congestion scenario, an incorrect evaluation of voice quality (e.g., QCI1 bearer packet delay versus speech-only frame delay) may result in excessive allocation of expensive radio network resources to be consumed unnecessarily. Additionally, inter-packet latency evaluation without considering Silence Insertion Descriptor (SID) frame existence which has a well-defined 160 ms periodicity for SID update frames within a voice packet stream may also mislead voice quality predictions and mask required remedy actions.

Prior art methods require the capture of IMS voice signaling messages or deploy costly probe systems to perform deep packet inspection to identify the AMR voice codec type. Additionally, prior art methods measure voice quality with QCI1 bearer packet loss rate and/or packet delay metrics with no separation of SID frame existence within the voice packet flow. Thus incorrect evaluation may increase precious base station resources to rectify voice quality degradation especially when MCS is heavily loaded.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages, and novel features of the disclosure will be set forth in the following detailed description of the disclosure when considered in conjunction with the drawings, which are intended to illustrate, not limit, the invention.

An aspect of the invention is directed to a method for dynamically improving a quality of a cellular voice call, comprising receiving voice packet data associated with the cellular voice call that includes a cellular mobile device in cellular communication with a base station, the voice packet data including a plurality of voice packets and representing a measurement time window, the measurement time window subdivided into a plurality of sub-measurement windows; determining an audio codec mode of the voice packet data and a number of silent indicator descriptor (SID) packets in the voice packet data based, at least in part, on an average packet length of voice packets in each sub-measurement window, a known length of SID frames in the voice packet data, and a set of predetermined packet lengths associated with a speech frame, each predetermined packet length corresponding to a respective known voice codec mode, each SID packet including at least one SID frame; determining one or more real-time data metrics of SID-free packets in at least some of the sub-measurement windows, the SID-free packets only including speech frames with the number of SID packets equal to 0; determining a predicted mean-opinion score (MOS) of the cellular voice call by feeding the real-time data metric(s) and the audio codec mode into a trained machine-learning model, the trained machine-learning model having been trained with known MOS values and known data metrics of test SID-free packets from test calls and known audio codec modes; and dynamically modifying a base-station configuration for the cellular mobile device to improve at least one of the real-time data metric(s) so as to improve an end-user perceived speech quality of the cellular voice call associated with the audio codec mode.

In one or more embodiments, the method further comprises identifying one or more first packets in at least a first sub-measurement window in which a packet loss occurs; and determining one or more packet-loss metrics of the voice packet data based, at least in part, on the one or more first packets, the real-time data metric(s) including the packet-loss metric(s). In one or more embodiments, the pack-loss metric includes a packet loss count and/or a packet-loss rate. In one or more embodiments, the method further comprises determining an inter-packet delay variance (IPDV) of the SID-free packets, the real-time data metric(s) including the IPDV.

In one or more embodiments, the method further comprises determining a current control-channel element (CCE) consumption ratio for the base station; and dynamically modifying a transmission time interval (TTI) allocation periodicity configuration of the base station for the cellular mobile device based on the predicted MOS and the current CCE consumption ratio. In one or more embodiments, the method further comprises comparing the predicted MOS to a threshold value, wherein when the predicted MOS is greater than or equal to the threshold value, the TTI allocation periodicity is set to a higher value compared to when the predicted MOS is lower than the threshold value, and when the predicted MOS is lower than the threshold value, the TTI allocation periodicity is set to a lower value compared to when the predicted MOS is greater than or equal to the threshold value. In one or more embodiments, the method further comprises comparing the current CCE consumption ratio to a threshold value, wherein when the current CCE consumption ratio is greater than or equal to the threshold value, the TTI allocation periodicity is set to a higher value compared to when the current CCE consumption ratio is lower than the threshold value, and when the current CCE consumption ratio is lower than the threshold value, the TTI allocation periodicity is set to a lower value compared to when the current CCE consumption ratio is greater than or equal to the threshold value.

In one or more embodiments, the TTI allocation periodicity configuration is modified according to a look-up table that provides reference TTI allocation configurations as a function of reference current CCE consumption ratios and reference predicted MOS values.

In one or more embodiments, the method further comprises receiving radio-frequency (RF) radio metric data for the cellular mobile device; and filtering the voice packet data using the RF radio metric data.

In one or more embodiments, the voice packet data is associated with a Quality-of-Service (QoS) Class Identifier 1 (QCI1) data radio bearer or a 5 QoS Identifier 1 (5QI1) data radio bearer of the cellular mobile device. In one or more embodiments, the method further (a) determining the number of SID packets in a first sub-measurement window according to a formula $$\text{Packet } SID = \frac{(RPS \times RTP \text{ Packet}) - RTP \text{ Byte}}{RPS - 19}$$

where RPS is a first packet length of the set of predetermined packet lengths associated with the speech frame, RTP Byte is a total number of bytes in the voice packets in the first sub-measurement window; and (b) determining if the number of SID packets in the first sub-measurement window is a positive integer; and (c) repeating steps (a) and (b) with a different packet length of the set of predetermined packet lengths associated with the speech frame until the number of SID packets in the first sub-measurement window is a positive integer.

In one or more embodiments, the voice packet data comprises real-time transport protocol (RTP) voice packet data.

Another aspect of the invention is directed to s speech detriment management system (SDMS) configured to receive voice packet data associated with the cellular voice call that includes a cellular mobile device in cellular communication with a base station, the voice packet data including a plurality of voice packets and representing a measurement time window, the measurement time window subdivided into a plurality of sub-measurement windows; determine an audio codec mode of the voice packet data and a number of SID packets in the voice packet data based, at least in part, on an average packet length of voice packets in each sub-measurement window, a known length of SID frames in the voice packet data, and a set of predetermined packet lengths associated with a speech frame, each predetermined packet length corresponding to a respective known voice codec mode, each SID packet including at least one SID frame; determine one or more real-time data metrics of SID-free packets in at least some of the sub-measurement windows, the SID-free packets only including speech frames with the number of SID packets equal to 0; determine a predicted MOS of the cellular voice call by feeding the real-time data metric(s) and the audio codec mode into a trained machine-learning model, the trained machine-learning model having been trained with known MOS values and known data metrics of test SID-free packets from test calls and known audio codec modes; and dynamically modify a base-station configuration for the cellular mobile device to improve at least one of the real-time data metric(s) so as to improve an end-user perceived speech quality of the cellular voice call associated with the audio codec mode.

Another aspect of the invention is directed to a computer program product comprising computer-readable instructions that, when executed by a processor, cause the processor to receive voice packet data associated with the cellular voice call that includes a cellular mobile device in cellular communication with a base station, the voice packet data including a plurality of voice packets and representing a measurement time window, the measurement time window subdivided into a plurality of sub-measurement windows; determine an audio codec mode of the voice packet data and a number of SID packets in the voice packet data based, at least in part, on an average packet length of voice packets in each sub-measurement window, a known length of SID frames in the voice packet data, and a set of predetermined packet lengths associated with a speech frame, each predetermined packet length corresponding to a respective known voice codec mode, each SID packet including at least one SID frame; determine one or more real-time data metrics of SID-free packets in at least some of the sub-measurement windows, the SID-free packets only including speech frames with the number of SID packets equal to 0; determine a predicted MOS of the cellular voice call by feeding the real-time data metric(s) and the audio codec mode into a trained machine-learning model, the trained machine-learning model having been trained with known MOS values and known data metrics of test SID-free packets from test calls and known audio codec modes; and dynamically modify a base-station configuration for the cellular mobile device to improve at least one of the real-time data metric(s) so as to improve an end-user perceived speech quality of the cellular voice call associated with the audio codec mode.

BRIEF DESCRIPTION OF THE DRAWINGS

For a fuller understanding of the nature and advantages of the concepts disclosed herein, reference is made to the detailed description of preferred embodiments and the accompanying drawings.

FIG. 4 is a table of example binned drive test data for a sub-measurement window.

FIG. 6 is a table of example of binned test drive data, including collected RTP metrics and calculated RTP metrics, for multiple sub-measurement windows.

DETAILED DESCRIPTION

Figure 1:
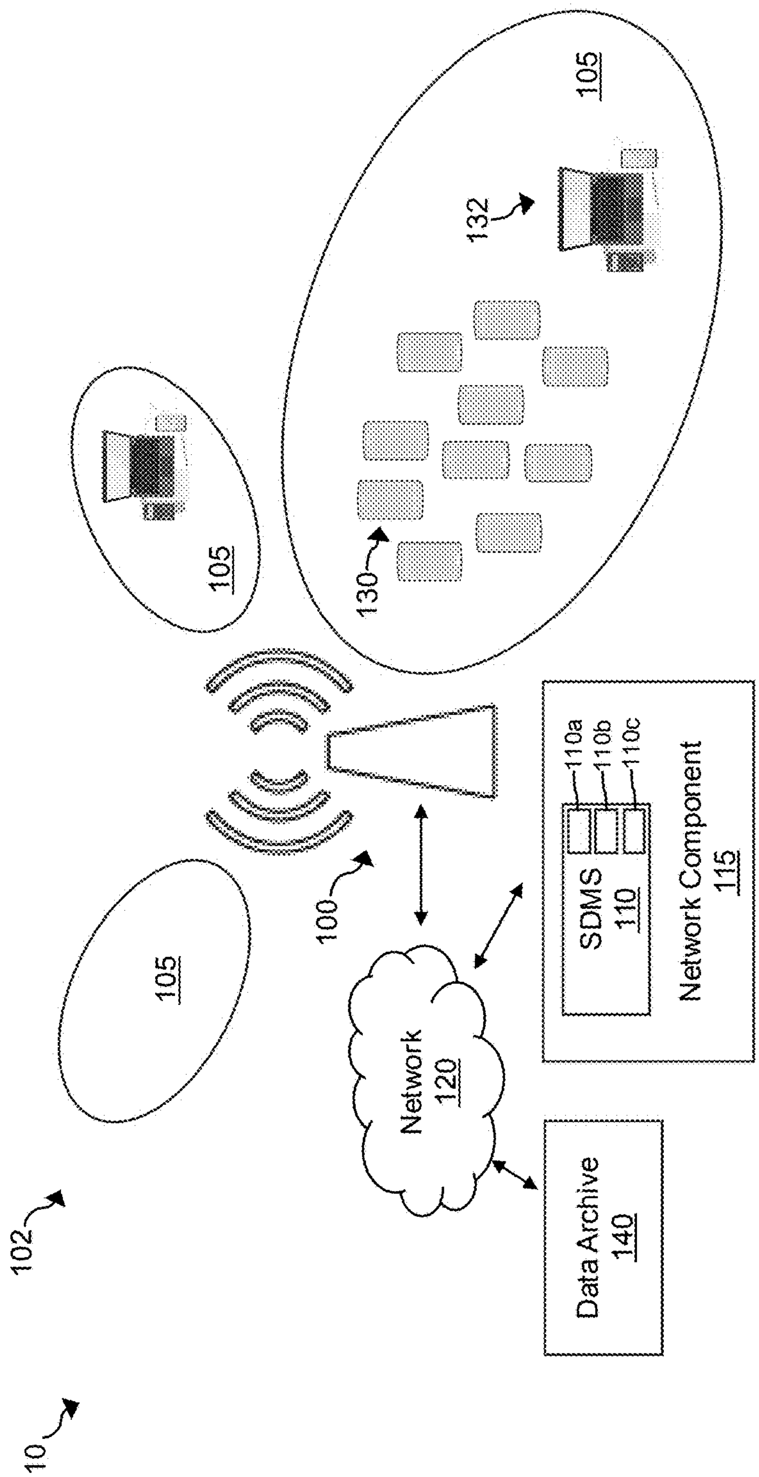
FIG. 1 is a block diagram of a cellular wireless system according to one or more embodiments.

Real-time performance metric data for a voice call associated with a cellular user equipment (UE) is monitored to predict a quality of the voice call and one or more associated metrics. One or more configuration parameters of a base station is/are updated to improve the associated metric(s) and the voice-call quality.

There are two voice-over-cellular (e.g., VoLTE, VoNR) traffic states of a UE: talk spurts and silent periods. During talk spurts, UEs transmit voice packets in uplink or UEs receive voice packets in downlink. Voice packets are produced at intervals of 20 ms, and the packet size as RTP (real-time transport protocol) payload/AMR frame size is determined by the voice/speech coding rate ranging from 13 octets to 61 octets for AMR NB and AMR WB voice codecs. During silent periods, the UE transmits silence insertion descriptor (SID) update frames or receives SID update frames at intervals of 160 ms. A second SID frame occurs 40 ms after first SID frame after when following continuous SID update frames exist at an interval of 160 ms. For different AMR speech codec rates, the SID frame size is always 56 bits as RTP payload/AMR frame size. A SID frame does not contain speech data and is separately sent to the other party to artificially generate an ambient noise effect.

In an example, one or more BS serving area of an MCS is/are determined. Test drives are performed with test UEs that perform repeated voice calls over an MCS. Voice packet quality/performance metrics (RTP metrics) and associated RF measurements are collected together with geography information, timestamps, and objective MOS evaluation audio score results (e.g., a perceptual objective listening quality assessment (POLQA) score) with a periodicity of 6 s (e.g. 4 s, 6 s, 8 s) during voice calls. The collected voice and RF metrics are exported and normalized/transformed/aggregated in sub-measurement windows (e.g., 480 ms, 500 ms, 520 ms) via a binning operation in time and space.

Within the binned voice packet quality metrics the existence of SID frames is determined amongst each sub-measurement window using a priori knowledge of RTP packet sizes by trying all possible codec modes with pre-determined packet sizes in bytes (e.g. AMR WB 23.85 with RTP packet=73 byte including 12 byte RTP header for one frame AMR). The average RTP byte per packet can be determined by dividing speech-only sub-measurement byte sum with speech-only sub measurement packet count.

A machine-learning model can be trained with the determined average RTP byte per packet size (i.e., AMR voice codec mode indicator) and optionally with UE manufacturer or UE manufacturer and model information (from (IMEI (International Mobile Equipment Identity) TAC (Type Allocation Code)) using (1) MOS_LQO_DL, (2) RTP packet loss count, (3) RTP packet loss rate where denominator excludes derived SID frame count over all sub measurement windows, and/or (4) average/maximum RTP inter packet delay variance (IPDV) where SID frame does not exist in any sub measurement window associated with measurement window. The model can be loaded into a speech detriment management system (SDMS) which may be communicatively coupled with a base station (eNodeB in LTE or gNB in NR Radio Access Network in an MCS). Additional and/or alternative real-time data metrics (e.g., in addition to or instead of RTP packet metric(s) and/or RTP IPDV) can be used in some embodiments.

After model deployment, QCI1/5QI1 PDCP SDU performance metric data can be collected and can be analyzed with a periodicity of 6 s (e.g., 4 s, 6 s, 8 s) (measurement window). The existence of SID frames can be determined among each 500 ms sub measurement (sub measurement window) within a measurement window using a priori knowledge of RTP packet sizes by trying all possible codec modes with well-defined packet sizes in bytes (e.g. AMR WB 23.85 with RTP packet=73 byte including 12 byte RTP header for one frame AMR). The average RTP byte per packet can be determined by dividing speech only sub measurement byte sum with speech-only sub measurement packet count.

For each measurement window (e.g. 6 s) the following data (per UE having a QCI1/5QI1 session) is stored in an online network database for ML inference purpose (1) RTP packet loss count, (2) RTP packet loss rate where denominator excludes derived SID frame count over all sub measurement windows, and/or (3) average/maximum RTP Inter packet delay variance where SID frame does not exist in any sub measurement window associated with measurement window. Using the trained model and the collected/processed data, a predicted MOS (pMOS) value for audio/speech users under the base station can be determined.

The Transmission Time Interval (TTI) allocation configuration for the UE can be determined/modified according to a table where the table provides a TTI allocation periodicity value for a determined/measured Control Channel Element (CCE) consumption ratio for the base station and a predicted MOS value for the UE. CCE consumption ratio is the ratio of current or historical average (average of current and previous values) consumption of CCE resources divided by the configured and available CCE resources in the base station. Predicted MOS is the current or historical average (average of current and previous values) predicted MOS value for the UE associated with a QCI1/5QI1 radio bearer data.

After TTI allocation configuration is determined, the SDMS dynamically causes the base station to modify the TTI allocation periodicity configuration (for the UE and the base station) so that the new TTI allocation periodicity configuration causes decreased CCE consumption ratio and decreased inter packet delay variance of a QCI1/5QI1 associated data radio bearer to improve end user perceived speech quality.

Figure 2:
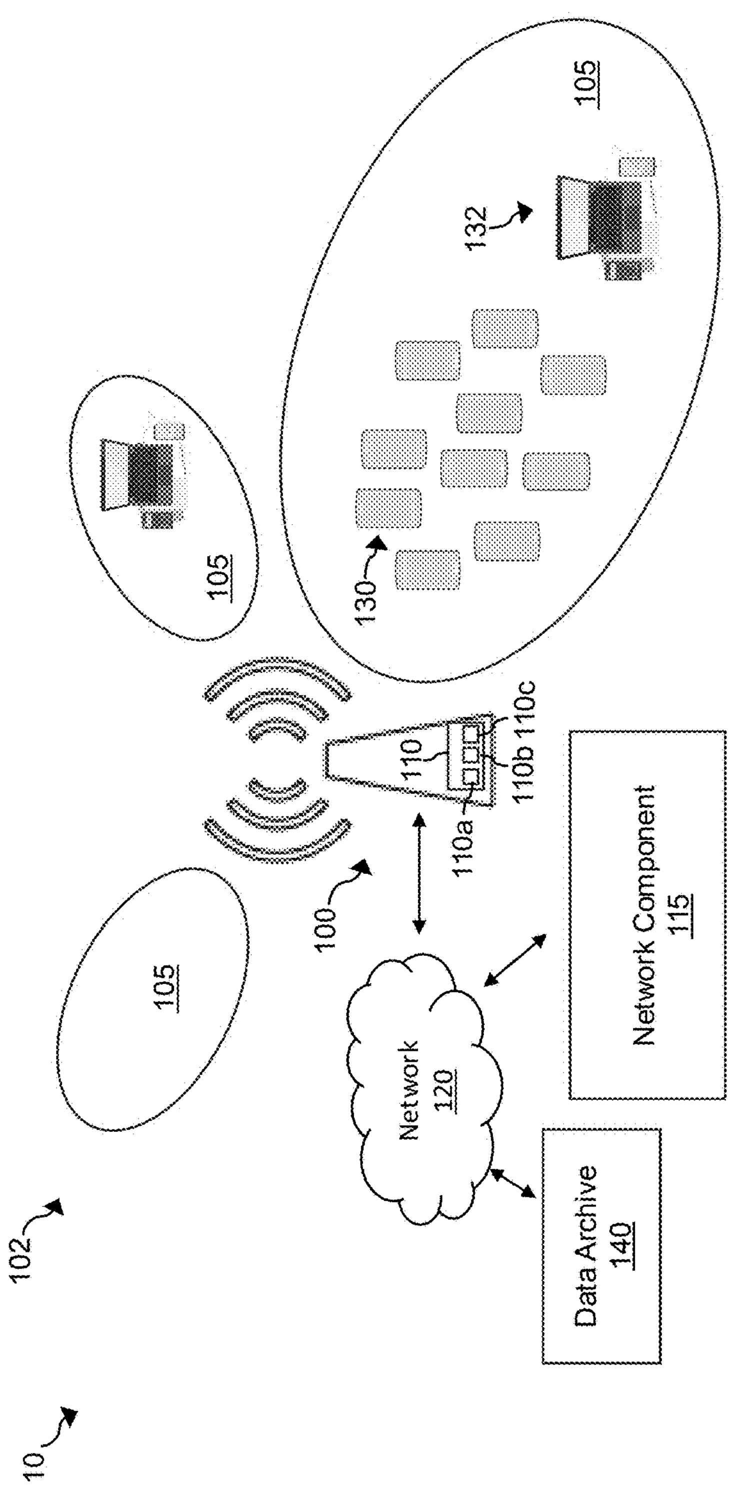
FIG. 2 is a block diagram of a cellular wireless system according to one or more alternative embodiments.

FIG. 1 is a block diagram of a cellular wireless system 10 according to one or more embodiments. The system 10 includes a base station 100 and a speech detriment management system (SDMS) 110. The base station 100 and the SDMS 110 are in communication with each other. The SDMS 110 is located and/or implemented in a network component 115 of the cellular wireless system 10 that is in wireless and/or wired communication with the base station 100 through a communications network 120. In other embodiments, the SDMS 110 is located and/or implemented in a base station 100, as illustrated in FIG. 2. In some embodiments, a first portion (e.g., one or more modules) of the SDMS 110 can be located and/or implemented in a network component 115 and a second portion (e.g., one or more modules) of the SDMS 110 can be located and/or implemented in a base station 100. Examples of the module(s) in the SMDS 110 include an SDMS training module 110*a*, an SDMS inference module 110*b*, and/or an SDMS TTI allocation configuration modifier module 110*c*.

In some embodiments, the SDMS 110 may include (or be communicatively coupled to) a base station 100 which is communicatively coupled to the UE(s) 130 such that the SDMS 110 may transmit to and/or receive requests and/or data from one or more UE(s) 130. The base station 100 may include a evolved E-UTRAN Node B (eNB) or Next Generation Node B (gNB). In some embodiments, UE(s) 130 may be subscribed to a mobile cellular service where UE(s) 130 are registered or subscribed to receive voice services over the network 120 via an IP Multimedia Subsystem (not shown in FIG. 1). The MCS provider may provide high-quality voice service under congested base station 100 to one or more or all voice service UE(s) 130 under serving area of one or more base stations 100.

The network component 115 can be a computing environment that includes a cloud computing platform, rack and node (computing devices, processing units, blades) with public cloud, private cloud, dedicated cloud, hybrid cloud, etc. The network component 115 can also additionally include one or more of a radio access network function of the base station 100 (e.g., baseband processing unit functions, (virtual) central unit, (virtual) digital unit, (virtual) baseband unit) for a split architecture in base station 100.

The base station 100 has a cellular coverage area 102 that includes one or more cells and/or sectors 105 to provide cellular coverage for the user equipment (UE(s)) 130 within the cell(s)/sector(s) 105. The UE(s) 130 include cellular devices such as mobile phones (e.g., smartphones), tablets, computers, and/or other devices.

Each UE 130 can be in a voice call with one or more other UEs 130. The UEs 130 in a given voice call can be located in the same cell/sector 105 or in different cells/sectors which can be associated with the same base station 100 or with another base station.

The SDMS 110 is configured to monitor/collect performance metrics (RTP, RF) of voice data packets sent to and/or from at least one UE 130, in the cell(s)/sector(s) 105 of the base station 100, that is engaged in a voice call to estimate a quality of service ("QoS") of the voice call. In some embodiments, the SDMS 110 is configured to monitor/collect performance metrics (RTP, RF) of voice data packets sent to and/or from a plurality (e.g., some or all) of UEs 130 in the cell(s)/sector(s) 105 of the base station 100 that are engaged in a voice call to estimate the QoS of the voice call. The performance metric data (e.g., information elements (IEs)) can be processed by the base station 100 and can be monitored and/or collected by the SDMS 110 which is included in or in communication with the base station 100.

The QoS can be estimated based on an estimated or predicted mean-opinion score ("MOS") of the voice call, for example using a trained machine-learning (ML) model. Based on the estimated QoS (e.g., predicted MOS) and the current capacity of the base station 100, the SDMS 110 can cause the base station 100 to dynamically change one or more base station cell radio parameters to improve the perceived QoS for the user of the UE 130.

Figure 3:
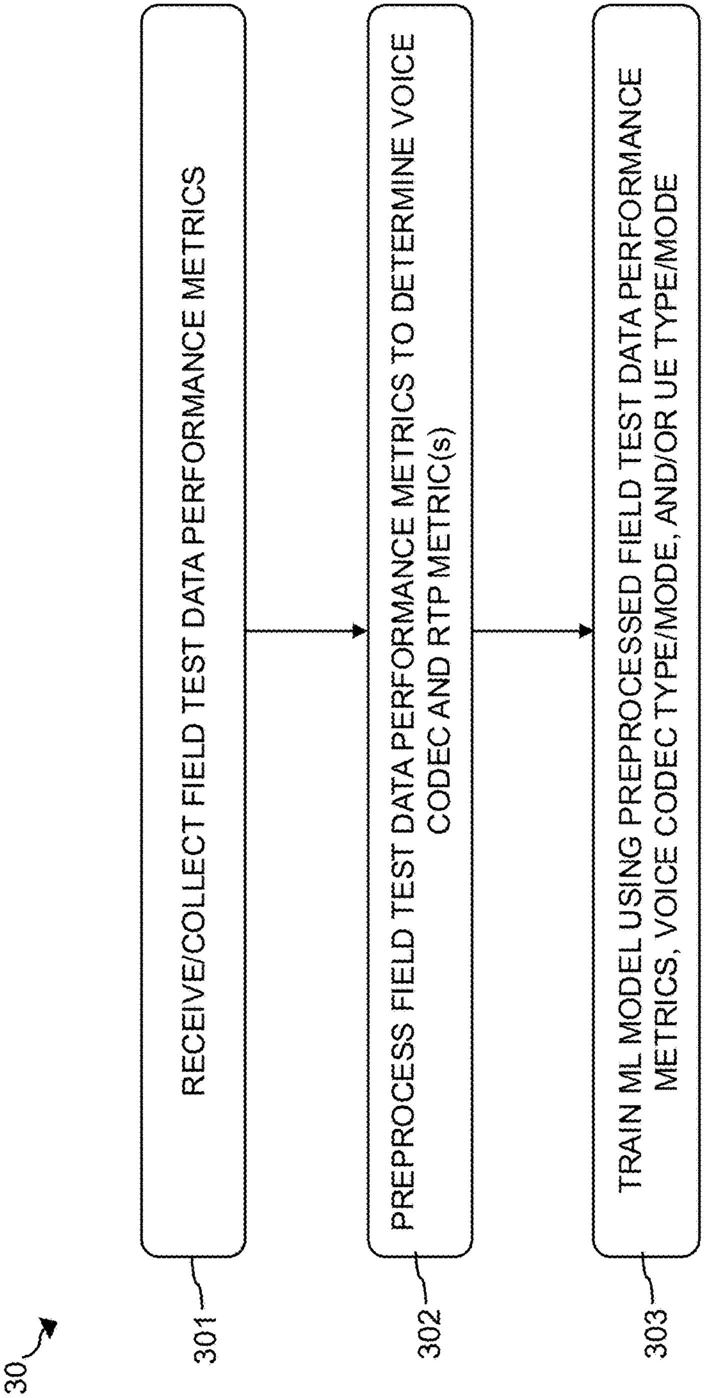
FIG. 3 is a flow chart of a method for training a machine-learning model to predict an MOS according to one or more embodiments.

FIG. 3 is a flow chart of a method 30 for training an ML model to predict an MOS according to one or more embodiments. In step 301, field test data performance metrics are received. The field test data performance metrics can be produced by performing drive (and/or walk) tests (in general, drive tests) in the cellular coverage area 102 of one or more base stations 100. The drive tests are performed with test UEs 132 (FIGS. 1, 2) that perform repeated voice calls over a mobile communication network. Method 30 can be performed by the SDMS 110, for example by the SDMS training module 110*a*.

Each test UE 132 may be one or more of a mobile phone, smartphone, data card, USB modem, fixed wireless terminal, and/or scanner. The test UE 132 may be used to perform test calls and collect their logs with associated latitude and longitude data (e.g. GPS data). A measurement collection unit (MCU), such as a laptop, with an application may be connected to the test UE 132 and/or to a GPS data reporting device via various interfaces (e.g., USB, Ethernet, WiFi). The MCU captures and records test data related events (performance metrics) such as voice call attempts, drops, blocks, packet data performance metrics (e.g., voice-over-LTE or voice-over-NR service—PDCP (Packet Data Convergence Protocol) level measurements (e.g., bytes, count), RTP (real-time transport protocol) level measurements (e.g., bytes, count), inter-packet delay variance, and/or jitter), and associated RF signal reception measurements for the test UE 132 (e.g., RSRP (reference signal received power), RSRQ (reference signal received quality), SINR (Signal to noise and interference ratio), CQI (channel quality indicator), and/or other RF signal reception measurements), radio interface configuration parameters (e.g. mobile country code, mobile network code (MCC, MNC), physical cell identifier (PCI), technology (LTE, NR), and/or mode of transfer (Frequency Division Duplex/Time Division Duplex (FDD/TDD), etc.), and/or GPS coordinates of measurements in latitude/longitude format with timestamp information.

In a voice quality measurement scenario, the MCU also runs a software (e.g. Nemo) implementing a standard method of objective evaluation of a received reference voice sample to compare the distortion effect on the reference voice sample after transmission over a medium from one UE to another UE to determine a POLQA (Perceptual Objective Listening Quality) score or a PESQ (Perceptual Evaluation of Speech Quality) score for the call at a periodicity (e.g., 4 seconds, 6 seconds, 8 seconds, or another time interval) during the test call. The POLQA/PESQ score is an objective measurement of an MOS.

In some embodiments, the MCU can also capture the IMEI (International Mobile Equipment Identity) TAC (Type Allocation Code) to identify the manufacturer and model number of the test UEs 132. The test UEs 132 can have the same IMEI TAC as a current commercial UE 130 in use. The road tests can be performed multiple times with test UEs 132 having different IMEI TACs that represent different commercial UEs 130 in use.

After voice quality measurement data (e.g., performance metrics in the form of IEs as exported by the MCU application) are collected typically in one or more milliseconds time resolution format depending on collected RTP and/or RF event occurrence post processing of data is applied with a binning operation specific for SDMS 110 defined measurement window and sub measurement window. The binning operation aggregates data points with specified filters to desired resolution to reduce data set size for practical handling of dataset for later processing and analysis. (e.g. time=500 ms; spatial=50 m×50 m).

Voice calls can be controlled by an IP multimedia subsystem (IMS) of an MCS where one or more modes of audio codecs AMR NB, AMR HD Voice service AMR WB (ITU-T G.722.2/3GPP AMR-WB) may be used.

Voice can refer to voice-over-LTE or voice-over-NR as a type of VoIP service. It is managed explicitly by an MCS via an IMS network. IP packets on network layer are used to carry speech frames where voice service quality is managed with service specific parameters (e.g., LTE QCI (quality of service class identifier)) in MCS.

An audio signal may be encoded with a specific audio codec type with a specific mode within the audio codec (e.g., AMR narrowband 8 modes, AMR Wideband 9 modes). The operator (of an MCS) has full control on allocated audio codecs for cellular users with a voice associated data radio bearer. User-plane related connectivity mechanisms within cellular network (e.g. via UDP (user data protocol), TCP (transmission control protocol), IP (internet protocol), data link layer protocols) are managed by nodes such as base stations, Serving Gateway (SGW), Packet Data Network Gateway (PDN GW/PGW), (Packet data unit Session Anchor) User Plane Function ((PSA)-UPF) etc.

The test UEs 132 can be configured to perform a test script that causes the test UEs 132 to perform a sequence of voice calls between the test UEs 132. An example test script is shown in Table 1.

TABLE 1

Sample Test Script

| Script line | Mobile Originating call Test UE | Mobile Terminating call Test UE (MSISDN Number: 0xxx123456) |
|---|---|---|
| 1 | Set Terminal Radio Off | Set Terminal Radio Off |
| 2 | Set Terminal Radio On | Set Terminal Radio On |
| 3 | Wait 5 sec | Wait 5 sec |
| 4 | Set band lock <Multiple bands> | Set band lock <Multiple bands> |
| 5 | Wait for system: LTE FDD System, at most 30 s | Wait for system: LTE FDD System, at most 30 s |
| 6 | Wait Time: 10 s | Wait Time: 10 s |
| 7 | Start loop: Repeat 1000 times | Start loop: Repeat 1000 times |
| 8 | Wait Time: 15 s | Wait Time: 15 s |
| 9 | Wait for script synchronization | Wait for script synchronization |
| 10 | Make a voice call: MSISDN Number: 0xxx123456, Duration: 90 s, Quality Measurement ON | Receive call: Duration:90 s, Quality Measurement ON |
| 11 | End a voice call: Normal | End a received call: Normal |
| 12 | Wait Time: 5 s | Wait Time: 5 s |
| 13 | End Loop: Normal | End Loop: Normal |

In step 302, the collected RTP and RF metrics are averaged/binned in time (based on received timestamp) and space (based on measurement location) for a time periodicity namely a "sub-measurement window" which may be around 500 ms. An example binned drive test data sample for a sub-measurement window is shown in FIG. 4.

The MOS timestamp is the point in time when a reference file is fully received by an MOS measurement unit for analysis to produce an MOS LQO (Listening Quality Objective) DL (downlink) score. The MOS LQO DL score can be the same as a POLQA/PESQ score.

Reference file duration in millisecond resolution is determined by MOS AQDL information element (IE). Thus, input RTP and RF data collected during a MOS measurement may be determined by (MOS Timestamp—MOS AQDL duration). For example, if a 6 second reference file is used and a MOS value is produced by MOS measurement unit at a timestamp T1, then an evaluation period namely a "measurement window" for RTP and RF metrics may be chosen as T1-6 seconds range. An analysis is performed within the measurement window over each sub-measurement window where for each MOS measurement window a MOS value and associated RTP and RF metrics for every sub measurement window are determined for downlink (DL) only.

An example of the collected RTP and RF metrics is shown in Table 2.

TABLE 2

| Collected IE | Calculated IE |
|---|---|
| UE (Event) Timestamp | RTP DL Byte Per Packet |
| Latitude | RTP DL IPSfDV |
| Longitude | |
| MOS Timestamp | |
| MOS AQDL Duration | |
| MOS LQO DL | |
| RTP DL Byte | |
| RTP DL Packet | |
| RTP DL Packet Loss | |
| RTP DL Packet Loss Rate | |
| RTP DL IPDV | |
| UE RSRP | |
| UE RSRQ | |
| UE SINR | |
| UE WideBand CQI Average | |
| UE EARFCN DL | |
| UE IMEI | |

Additional details of the RTP metrics are provided in Table 3.

TABLE 3

| IE name | Description |
|---|---|
| RTP DL Packet | (UE successfully received, positively acknowledged by the UE) count of QCI1/5QI1 PDCP SDU packets using RLC UM (Radio link control protocol with Unacknowledged Mode of transfer) associated with downlink successfully received AMR speech and/or AMR SID frames in a block of RTP packets |

TABLE 3-continued

| IE name | Description |
| --- | --- |
| RTP DL Byte | (UE successfully received, positively acknowledged by the UE) count of QCI1/5QI1 PDCP SDU bytes excluding UDP/IP/SDAP headers using RLC UM associated with downlink successfully received AMR speech and/or AMR SID frames in a block of RTP packets |
| RTP DL Byte Per Packet | (RTP DL Byte)/(RTP DL Packet) Average RTP DL bytes per packet where packet payload is speech and/or SID frames. |

After the field test data performance metrics are collected and/or received, the field test data performance metrics are preprocessed by the SDMS 110 in step 302.

For each sub measurement window, RTP downlink packet count and RTP downlink (packet) byte sum is analyzed to determine if a SID frame exists or not. If a SID frame exists, RTP inter packet delay variance measurement for that sub-measurement window is tagged to be excluded during measurement window based IPDV calculations. Another scenario for tagging a sub measurement for IPDV is the case that at least one RTP packet loss exists during sub measurement window.

RTP downlink packet count and RTP downlink packet byte sum over all sub-measurement windows are used to determine if the collected data amount is enough for SDMS analysis. (e.g., RTP downlink packet count>threshold1 and/or RTP downlink packet byte sum>threshold2 during a measurement window).

After SDMS analysis of RTP downlink packet count, RTP downlink byte sum and derived SID count, and AMR voice codec mode/type are determined, for example by comparing a table with a prior knowledge of possible RTP packet sizes (applicable for both downlink and uplink) carrying speech frames and the determined RTP downlink byte per packet.

Derived AMR voice codec mode and reported UE manufacturer and model information (using IMEI TAC info extracted from UE IMEI) is stored together with aggregated/binned RTP and RF radio metrics over the collected sub measurements. This aggregation/binning is performed as various statistical operations such as averaging, median, maximum, statistical deviation calculations. An exception is applied during IPDV calculation where tagged values are excluded.

RF radio metrics may be used to apply a filtering operation over SDMS actions where collected data at measurement window level may be excluded if an associated RF metric threshold is not satisfied. (e.g. average UE RSRP worse than −110 dBm and/or average UE RSRQ worse than −12 dB etc.). Similarly, served EARFCN metrics may also be used to apply filtering operation over SDMS actions so that measurements associated with a specific EARFCN set is used during SDMS method.

Figure 5:
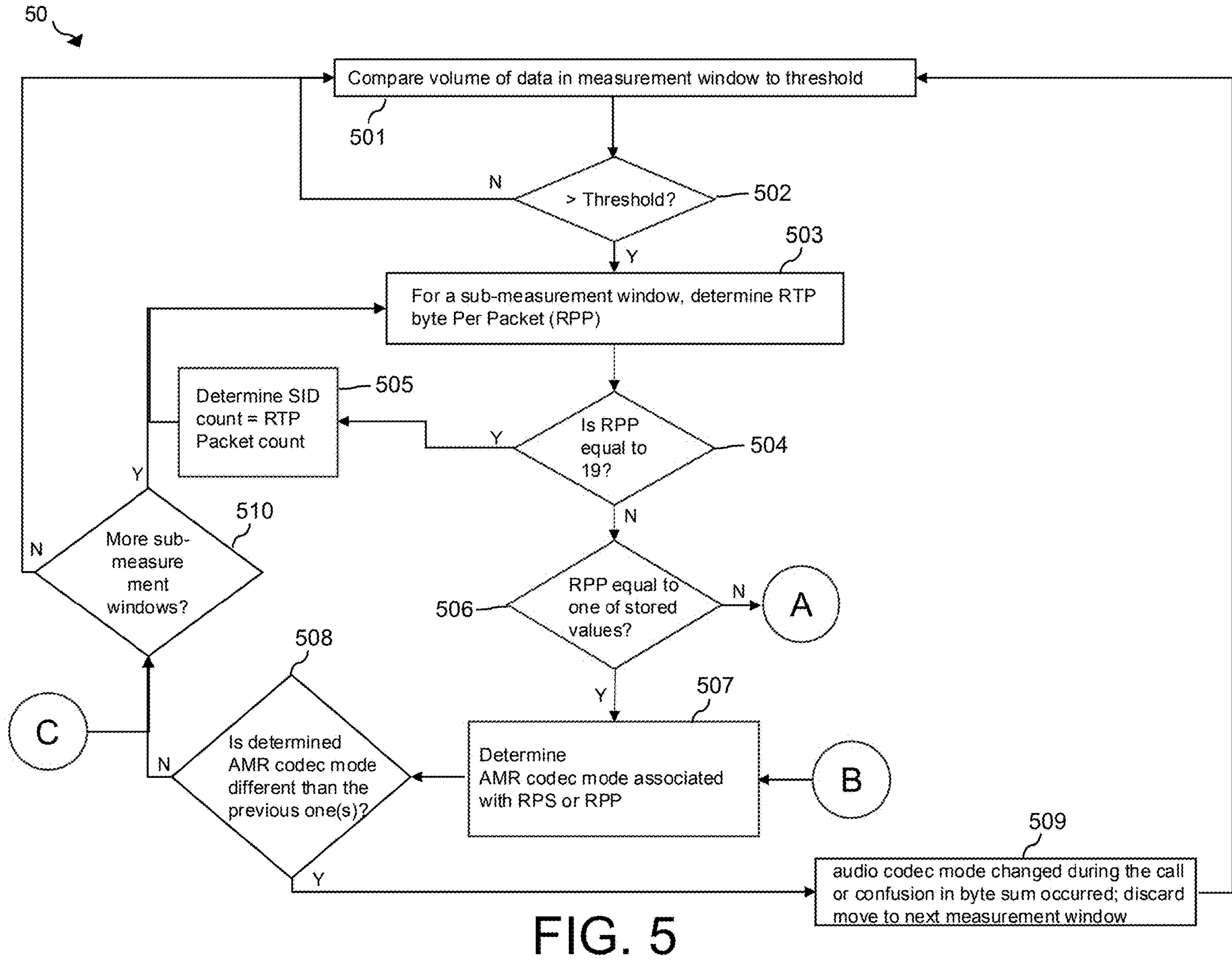
FIG. 5 is a flow chart of a method for determining an audio codec.
Figure 5:
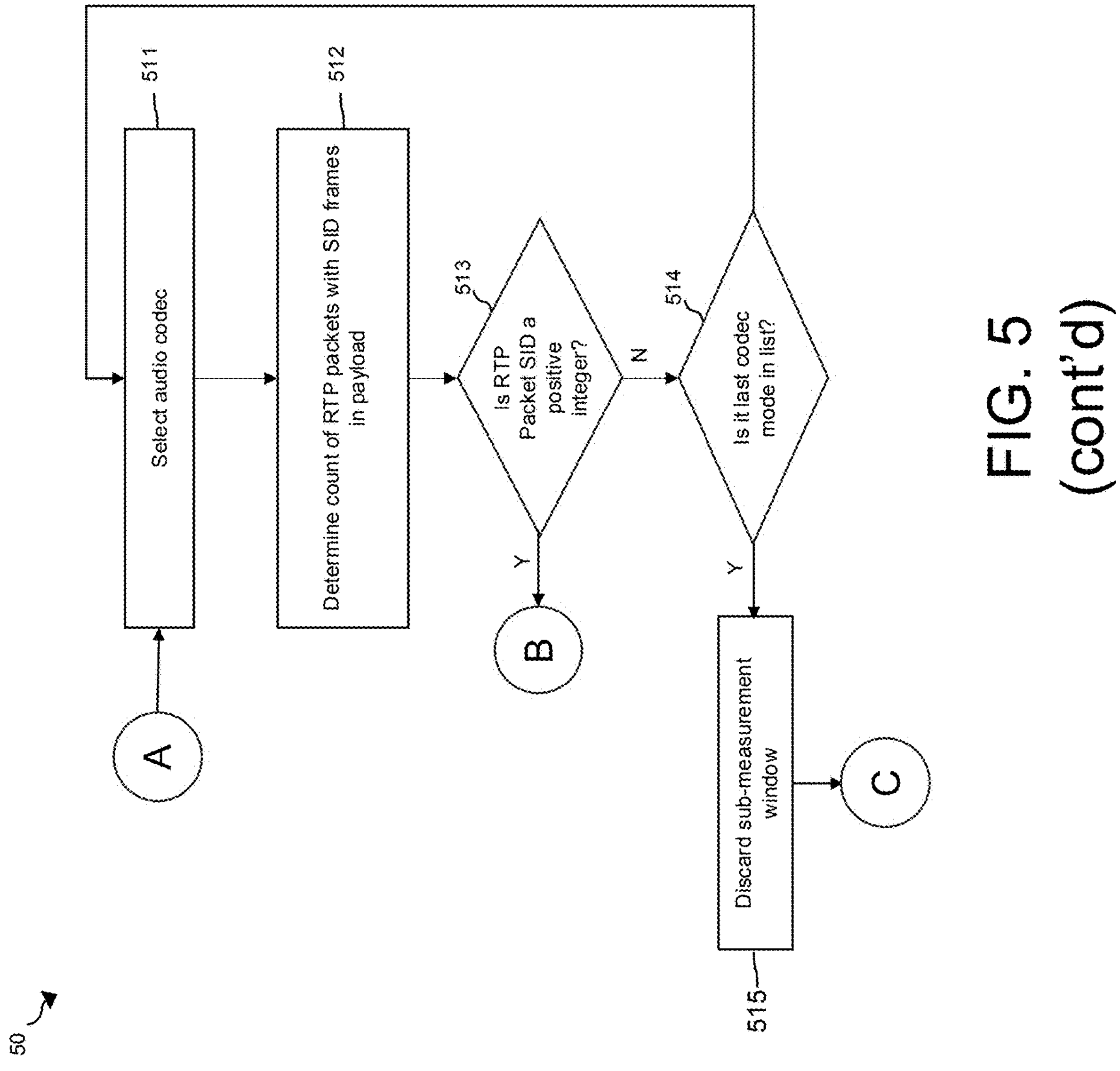

Preprocessing includes determining the audio codec mode/type for the RTP packets received in each measurement window and in each sub-measurement window. The audio codec can be determined using method 50 in FIG. 5.

In step 501, the quantity of data in a measurement window is compared to one or more thresholds. The quantity of data compared can be the sum of the RTP DL bytes, the sum of RTP DL packets, or both with its/their corresponding thresholds in the measurement window. If the quantity of data is above the threshold (i.e., step 502=yes), the method proceeds to step 503. If the quantity of data is lower than or equal to the threshold (i.e., step 502=no), the data in the measurement window is discarded and the method returns to step 501 to compare the quantity of data in another (e.g., subsequent) measurement window to the threshold.

In step 503, a first sub-measurement window (e.g., between T0 and T1) is analyzed to determine the RTP bytes Per Packet (RPP). The RPP is determined by dividing the RTP bytes in the first sub-measurement window by the number of packets in the first sub-measurement window. The RPP can be determined for DL during training.

If the RPP is equal to 19 (i.e., step 504=yes), then it is determined that the RTP bytes are silent descriptor indication (SID) frames and the number of SID frames in the first sub-measurement window are determined in step 505. For example, the number of SID frames is equal to the number of packets transmitted in the first sub-measurement window. The sub-measurement window can also be tagged as including one or more SID frames for future processing. After step 505, the flow chart returns to step 503 to determine the RPP on the next (e.g., second or subsequent) sub-measurement window.

If the RPP is not equal to 19 (i.e., step 504=no), the RPP is compared to each of a plurality of predetermined codec values (for respective predetermined audio codecs) in step 506. Examples of the predetermined codec values are provided in Table 4 where each RTP packet length (byte) is the predetermined codec value for a respective audio codec. For example, AMR Wideband 23.85 kbps has a codec value (or length) of 73. In some embodiments, the wideband codecs can be evaluated before the narrowband to avoid the potential confusion when for the codec value of 30 which is the same for AMR Wideband 6.6 kbps and AMR Narrowband 6.7 kbps. Thus, it can be assumed in some embodiments that a codec value of 30 is AMR Wideband 6.6 kbps. In other embodiments, the narrowband codecs can be evaluated before the wideband codecs in which case it can be assumed in some embodiments that a codec value of 30 is AMR Narrowband 6.7 kbps.

TABLE 4

| Audio Codec | AMR frame/RTP payload size (byte) | RTP header size (byte) | RTP packet length (byte) |
| --- | --- | --- | --- |
| AMR Wideband 23.85 kbps | 61 | 12 | 73 |
| AMR Wideband 23.05 kbps | 59 | 12 | 71 |
| AMR Wideband 19.85 kbps | 51 | 12 | 63 |
| AMR Wideband 18.25 kbps | 47 | 12 | 59 |
| AMR Wideband 15.85 kbps | 41 | 12 | 53 |
| AMR Wideband 14.25 kbps | 37 | 12 | 49 |

TABLE 4-continued

| Audio Codec | AMR frame/RTP payload size (byte) | RTP header size (byte) | RTP packet length (byte) |
|---|---|---|---|
| AMR Wideband 12.65 kbps | 33 | 12 | 45 |
| AMR Wideband 8.85 kbps | 23 | 12 | 35 |
| AMR Wideband 6.6 kbps | 18 | 12 | 30 |
| AMR Narrowband 12.2 kbps | 31 | 12 | 43 |
| AMR Narrowband 10.2 kbps | 26 | 12 | 38 |
| AMR Narrowband 7.95 kbps | 21 | 12 | 33 |
| AMR Narrowband 7.4 kbps | 19 | 12 | 31 |
| AMR Narrowband 6.7 kbps | 18 | 12 | 30 |
| AMR Narrowband 5.9 kbps | 16 | 12 | 28 |
| AMR Narrowband 5.15 kbps | 14 | 12 | 26 |
| AMR Narrowband 4.75 kbps | 13 | 12 | 25 |

If the RPP is equal to one of the predetermined codec values (i.e., step 506=yes), then the audio codec is determined to be the one corresponding to the predetermined codec value in step 507.

In step 508, the audio codec determined in step 507 for the first sub-measurement window is compared to the audio codec determined for any other sub-measurement windows of the current measurement window. If yes (i.e., step 508=yes), then it is determined that the audio codec has changed during the call and/or within the measurement window and the measurement window data is discarded in step 509. After step 509, the flow chart returns to step 501 to process data for another (e.g., a subsequent) measurement window.

If the audio codec determined in step 507 for the first sub-measurement window is the same as the audio codec(s) determined in any other sub-measurement windows or if this is the first sub-measurement window analyzed (i.e., step 508=no), then the flow chart proceeds to step 510 to determine whether there are any additional sub-measurement windows to analyze for the measurement window. If so (i.e., step 510=yes), the flow chart proceeds to step 503 to determine the RPP for the next sub-measurement window (e.g., a second or subsequent sub-measurement window). If not (i.e., step 510=no), the flow chart proceeds to step 501 to pre-process data for another measurement window (e.g., a second or subsequent measurement window).

If the RPP is not equal to one of the predetermined codec values (i.e., step 506=no), then the flow chart proceeds to step 511 (via placeholder A) where a first of a plurality of predetermined codec values is selected. The predetermined codec values are the same as described above with respect to in step 506 (e.g., including the examples shown in Table4). In some embodiments, the wideband codecs can be selected first starting with the highest RTP packet length. In each iteration through step 511, the wideband codec with the next-highest RTP packet length can be sequentially selected until all wideband codecs have been selected. After all wideband codecs have been selected, the narrowband codecs can be selected first starting with the highest RTP packet length and proceeding with the next-highest RTP packet length in each subsequent iteration.

The predetermined codec values can be iterated through in other sequences in other embodiments. For example, the wideband codecs can be selected starting with the lowest RTP packet length and iterating through the wideband codecs with the next-lowest RTP packet length. Similarly, the narrowband codecs can be selected starting with the lowest RTP packet length and iterating through the wideband codecs with the next-lowest RTP packet length. In some embodiments, the narrowband codecs can be selected before the wideband codecs. In some embodiments, the narrowband codecs and/or the wideband codecs can be selected at random or in any sequence which can be a predetermined sequence.

In step 512, the count of RTP packets with SID frames is determined. The count can be determined according to Equation 1:

$$RTP\text{ Packet }SID = \frac{(RPS \times RTP\text{ Packet}) - RTP\text{ Byte}}{RPS - 19} \quad (1)$$

where RPS is the RTP packet length of the wideband or narrowband codec selected in step 511, RTP Packet is the number of RTP packets in the sub-measurement window, and RTP Byte is the total number of bytes in the RTP packets in the sub-measurement window.

If the count of RTP packets with SID frames (RTP Packet SID in Equation 1) is a positive integer (i.e., step 513=yes), then the selected audio codec is determined to be the audio codec for the first sub-measurement window in step 507 (via placeholder B). The sub-measurement window can also be tagged as including one or more SID frames. If the count of RTP packets with SID frames (RTP Packet SID in Equation 1) is not a positive integer (i.e., step 513=no), the flow chart proceeds to step 514 to determine whether the selected audio codec is the last audio codec in the list of predetermined audio codecs. If not (i.e., step 514=no), then the flow chart returns to step 511 to select another audio codec. If the selected audio codec is the last audio codec (i.e., step 514=yes), then the audio codec for the first sub-measurement window cannot be determined and the sub-measurement window is discarded in step 515. After step 515, the flow chart returns to step 510 (via placeholder C).

Preprocessing the field test data in step 302 also includes determining the RTP inter-packet delay variance (IPDV) between sequential RTP packets transmitted between each test UE 132 and the base station 100. Per measurement window, the IPDV is only calculated for RTP packets that do not include any SID frames and that do not include any packet loss in between two received RTP packets within a sub-measurement window This IPDV can be referred to as inter packet SID-free delay variance (IPSfDV).

The RTP IPSfDV for DL and UL can be calculated as shown in Table 5. It is noted that only the RTP IPSfDV for DL is used during ML training (e.g., method 30).

TABLE 5

| RTP DL IPSfDV | RTP UL IPSfDV |
|---|---|
| For each successfully received RTP packet from the BS by the UE (except the first one) where [Absolute value of (a value of Packet Data Convergence Protocol (PDPCP) Sequence Number (SN) associated with a QCI1/5QI1 PDCP SDU associated with a first RTP packet received from the BS) − (a value of PDCP SN associated with a QCI1/5QI1 PDCP SDU associated with a second RTP packet received from the BS) = 1] (as consecutive condition for PDCP packets received) RTP DL IPSfDV = absolute value of (E − F) where: E = [(The first RTP packet header source timestamp) − (The second RTP packet header source timestamp)]/(RTP packet source clock rate constant) (i.e., 16 for Wideband mode, 8 for Narrowband mode) F = [Timestamp when UE successfully received a QCI1 PDCP PDU using radio link control (RLC) unacknowledged mode (UM) associated with the first RTP packet − [Timestamp when UE successfully received a QCI1 PDCP PDU using RLC UM associated with the second RTP packet] | For each successfully sent RTP packet from the UE to the BS (except the first one) where [Absolute value of (a value of PDPCP SN associated with a QCI1/5QI1 PDCP SDU associated with a first RTP packet sent from the UE) − (a value of PDCP SN associated with a QCI1/5QI1 PDCP SDU associated with a second RTP packet sent from the UE) = 1] (as consecutive condition for two packets sent) RTP UL IPSfDV = absolute value of (E − F) where: E = [The first RTP packet header source timestamp] − [The second RTP packet header source timestamp]/[RTP packet source clock rate constant (i.e., 16 for Wideband mode, 8 for Narrowband mode) F = [Timestamp when last block of a QCI1/5QI1 PDCP SDU associated with the first RTP packet was successfully received by the BS according to UE received MAC HARQ positive acknowledgement − [Timestamp when last block of a QCI1/5QI1 PDCP SDU associated with the second RTP packet was successfully received by the BS according to UE received MAC HARQ positive acknowledgement] |

One or more additional IEs in Table 6 can be determined. It is noted that only the DL IE(s) (e.g., RTP DL Packet SID, RTP DL Packet Speech, and/or RTP DL Byte Per Packet Speech) is/are determine during ML training (e.g., method 30).

TABLE 6

| IE Name | Description |
|---|---|
| RTP DL Packet SID | Count of RTP DL packet with only SID frames in payload This is a derived value using a prior knowledge on possible RTP DL Packet Speech length in bytes (RtpDlPacketSpeechLength) and measured values on RTP DL Byte (RtpDlByte) and RTP DL Packet (RtpDlPacket) |
| RTP UL Packet SID | Count of RTP UL packet with only SID frames in payload This is a derived value using a prior knowledge on possible RTP UL Packet Speech length in bytes (RtpUlPacketSpeechLength) and measured values on RTP UL Byte (RtpUlByte) and RTP UL Packet (RtpUlPacket) |
| RTP DL Packet Speech | Count of RTP DL packet with only speech frames in payload RTP DL Packet − RTP DL Packet SID |
| RTP UL Packet Speech | Count of RTP UL packet with only speech frames in payload RTP UL Packet − RTP UL Packet SID |
| RTP DL Byte Per Packet Speech | Average RTP DL bytes per packet where packet payload is speech only. |
| RTP UL Byte Per Packet Speech | Average RTP UL bytes per packet where packet payload is speech only. |

Derived AMR voice codec mode and reported UE manufacturer and model information (using IMEI TAC info extracted from UE IMEI) can be stored together with aggregated/binned RTP and RF radio metrics over the collected sub measurements. This aggregation/binning is performed as various statistical operations such as averaging, median, maximum, statistical deviation calculations. An exception is applied during IPDV calculation where tagged values are excluded.

RF radio metrics may be used to apply a filtering operation over SDMS actions where collected data at measurement window level may be excluded if an associated RF metric threshold is not satisfied. (e.g. average UE RSRP worse than −110 dBm and/or average UE RSRQ worse than −12 dB etc.). Similarly, served E-UTRA Absolute Radio Frequency Channel Number (EARFCN) for LTE/New Radio Absolute Radio Frequency Channel Number (NR-ARFCN) for NR metrics may also be used to apply a filtering operation over SDMS actions so that measurements associated with a specific (E)ARFCN set is used during SDMS method.

For ML training, preprocessing in step 302 can include objective audio quality downlink voice MOS measurements performed every 15 seconds over the last 6 seconds of collected data from the reported MOS timestamp. 15 seconds and 6 seconds durations are based on the script that is used to initiate test calls between two voice call test UEs 132 managed by IMS.

Binning can be applied for RTP-related information elements (e.g., IE(s)) per RTP information collection value for every 480 ms, 500 ms, 520 ms, or any other duration depending on collected count of RTP packets at that instant. Binning can also be applied for UE RF related information elements (e.g., RSRP, RSRQ, CQI, and/or DL SINR) per RF information collection (e.g., an IE value produced in source and received for every 1,000 ms)

Binning can include average, median, maximum operations over the collected IEs. Additionally/optionally, histogram translations (e.g., in the form of a histogram array) may be done for IPDV measurements where an array with elements from 1 to N shall store count of collected information element values. An example of a histogram array is shown in Table 7.

TABLE 7

| IPDV Histogram Array | Lower boundary (ms) (greater than) | Upper boundary (ms) (less than or equal) |
|---|---|---|
| BIN1 | negative infinity | −20 |
| BIN2 | −20 | 0 |
| BIN3 | 0 | 20 |
| BIN4 | 20 | 40 |
| BIN5 | 40 | 60 |
| BIN6 | 60 | positive infinity |

RTP-related IEs can be merged with UE RF-related IEs in the histogram/sub-measurement windows. The UE RF IE values can be repeated for the corresponding instants during RTP information collection (e.g., UE RF related information element collection frequency 1000 ms and RTP information collection every ~500 ms). In one example, an MOS measurement value has 12 associated sub measurements (e.g., for each ~500 ms time interval).

An example of binned test drive data, including collected RTP metrics and calculated RTP metrics, for multiple sub-measurement windows is shown in FIG. 6.

A training database (e.g., in data archive 140) for the ML model can be formed. The training database can include for each measurement window (e.g. 6 s) the following data as target values and features for training purpose; (1) MOS_LQO_DL (target value), (2) RTP packet loss count, (3) RTP packet loss rate where denominator excludes derived SID frame count over all sub measurement windows, (4) average/maximum RTP Inter packet variance delay where SID frame does not exist in any sub measurement window associated with measurement window (e.g., IPSfDV for DL), (5) audio codec mode/type, and/or (6) UE manufacturer and/or UE model (e.g., UE IMEI TAC).

In step 303 (FIG. 3), the preprocessed data is fed to an untrained ML model to train the ML model. Examples of the ML model include an Extra Trees Regressor, a Random Forest Regressor, a Bagging Regressor, a Decision Tree Regressor, an XGB Regressor, a Cat Boost Regressor, an LGBM Regressor, a Hist Gradient Boosting Regressor, a Gradient Boosting Regressor, and/or an MLP Regressor.

Data used to train the ML model can include RTP packet loss count (DL), RTP packet loss rate (DL) where denominator excludes derived SID frame count over all sub measurement windows, average and/or maximum RTP IPSfDV (DL), MOS LQO DL, and/or AMR audio codec type/mode for each measurement window. In some embodiments, downlink RF radio metrics (e.g., UE RSRP, UE RSRQ, UE SINR, and/or UE Wideband CQI Average) can be used as filters for the training data. The average or median values of the downlink RF radio metrics can be used for each measurement window associated with an MOS to determine if a respective measurement window can be used as training data. For example, average or median values of the downlink RF radio metrics can be compared with a respective threshold.

In some embodiments, the UE IMEI can be used to filter data for ML modeling such as based on the UE manufacturer (e.g., Apple) and/or UE model number (Apple iPhone 14). A separate/dedicated ML model can be trained for each UE manufacturer and/or for each UE model number.

Using training data flow from the SDMS training database, one or more ML model is trained, evaluated and stored in a ML model catalogue. The ML model catalogue is then deployed on SDMS ML inference engine.

Under same conditions (e.g. packet loss, inter packet delay variance), voice quality (objective MOS) may be different for different voice codec type (AMR NB, AMR WB), voice codec modes, UE manufacturer and UE models within the manufacturer.

One ML model may be trained for a voice codec type/mode and UE manufacturer (as part of IMEI TAC info). Optionally, ML model may also be trained based on UE manufacturer and model type.

Figure 7:
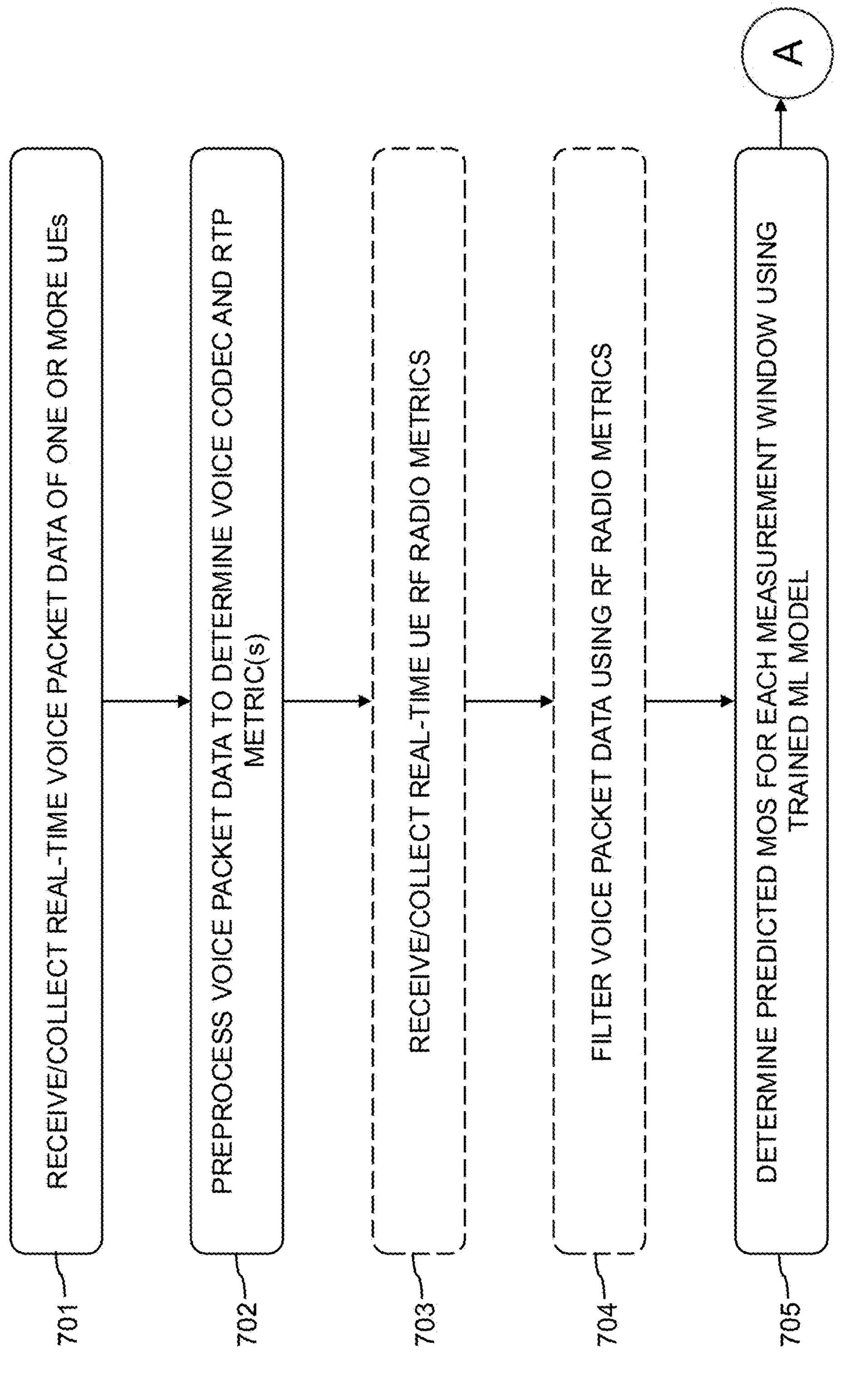
FIG. 7 is a flow chart of a method for dynamically improving perceived voice quality according to one or more embodiments.
Figure 7:
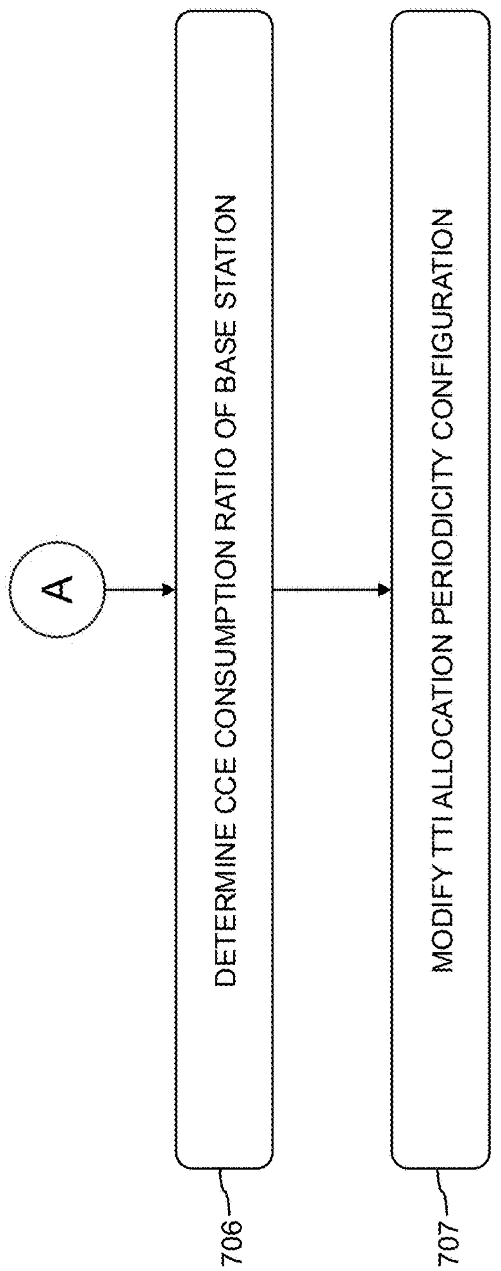

FIG. 7 is a flow chart of a method 70 for dynamically improving the perceived AMR voice quality according to one or more embodiments. Method 70 can be performed by an SDMS 110.

In step 701, an SDMS 110 collects or retrieves real-time voice packet data (e.g., RTP data) measurements of one or more UEs 130 that is/are in cellular communication with the base station 100. The real-time voice packet data measurements can be stored in the base station 100, in the SDMS 110, and/or in the data archive 140.

The SDMS 110 can receive an indication to apply voice quality remedy actions for one or more UEs 130 identified by one or more identifiers such as IMEI, IP address, or another UE identifier. The SDMS 110 then configures/subscribes to/initiates collection of identified UE specific qci1/5qi1 data radio bearer related PDCP SDU (LTE) or SDAP SDU (NR) or RTP (LTE, NR) measurements at the base station 100 for the UE.

The SDMS collected data (e.g., 3GPP information elements IEs) for the UE(s) 130 can be for downlink (DL) from base station to UE, uplink (UL) from UE to base station or both DL and UL. Examples of the SDMS collected data include downlink and uplink RTP metrics such as (RTP packet count (RTP DL Packet, RTP UL Packet), RTP packet byte sum (RTP DL Byte, RTP UL Byte), RTP packet loss count (RTP DL Packet Loss, RTP UL Packet Loss), RTP packet loss rate (RTP DL packet loss rate, RTP UL packet loss rate), RTP inter packet delay variance (RTP DL Inter Packet Delay Variance, RTP UL Inter Packet Delay Variance), timestamp (UE event timestamp), and/or other UE related metrics (served EARFCN, UE IMEI). The SMDS collected data can also include UE RF radio metrics such as downlink LTE UE RF radio metrics (UE RSRP, UE RSRQ, UE Wideband CQI Average), uplink LTE UE RF radio metrics (UE RSRP, UE RSRQ, UE SINR), downlink NR RF radio metrics (UE RSRP, UE RSRQ, UE SINR, UE Wideband CQI Average), and/or uplink NR RF radio metrics (UE RSRP, UE RSRQ, UE SINR). Additional details on at least some of the SMDS collected data are provided in Table 8.

TABLE 8

| IE Name | BS (Base Station) QCI1/5QI1 PDCP SDU level measurement point | BS RTP level measurement point |
|---|---|---|
| RTP DL Packet | [BS successfully transmitted, positively acknowledged by the UE] count of QCI1/5QI1 PDCP SDU packets using RLC UM associated with downlink successfully received AMR speech and/or AMR SID frames in a block of RTP packet | [BS successfully transmitted, positively acknowledged by the UE] count of RTP packets inside QCI1/5QI1 PDCP SDUs using RLC UM associated with downlink successfully received AMR speech and/or AMR SID frames in a block of RTP packet |

TABLE 8-continued

| IE Name | BS (Base Station) QCI1/5QI1 PDCP SDU level measurement point | BS RTP level measurement point |
|---|---|---|
| RTP DL Byte | [BS successfully transmitted, positively acknowledged by the UE) count of QCI1/5QI1 PDCP SDU bytes excluding UDP/IP/SDAP headers using RLC UM] associated with downlink successfully received AMR speech and/or AMR SID frames in a block of RTP packet | [BS successfully transmitted, positively acknowledged by the UE) count of RTP packet bytes inside QCI1/5QI1 PDCP SDUs excluding UDP/IP/SDAP headers using RLC UM] associated with downlink successfully received AMR speech and/or AMR SID frames in a block of RTP packet |
| RTP UL Packet | [BS successfully received, positively acknowledged by the BS] count of QCI1/5QI1 PDCP SDU packets using RLC UM] associated with uplink successfully sent AMR speech and/or AMR SID frames in a block of RTP packet | [BS successfully received, positively acknowledged by the BS] count of RTP packets inside QCI1/5QI1 PDCP SDUs using RLC UM] associated with uplink successfully sent AMR speech and/or AMR SID frames in a block of RTP packet |
| RTP UL Byte | [BS successfully received, positively acknowledged by the BS] count of QCI1/5QI1 PDCP SDU bytes excluding UDP/IP/SDAP headers using RLC UM associated with uplink successfully sent AMR speech and/or AMR SID frames in a block of RTP packet | [BS successfully received, positively acknowledged by the BS) count of RTP packet bytes inside QCI1/5QI1 PDCP SDUs excluding UDP/IP/SDAP headers using RLC UM] associated with uplink successfully sent AMR speech and/or AMR SID frames in a block of RTP packet |
| RTP UL Byte Per Packet | (RTP UL Byte)/(RTP UL Packet) Average RTP UL bytes per packet where packet payload is speech and/or SID frames. | |
| RTP DL Byte Per Packet | (RTP DL Byte)/(RTP DL Packet) Average RTP DL bytes per packet where packet payload is speech and/or SID frames. | |

Collected RTP metrics are binned in time (e.g., averaging) for each sub-measurement window (e.g. 500 ms) which can be configured by an SDMS policy. Other associated RF radio metrics are either collected separately by their time-stamps or binned in time (e.g., averaging) in accordance with each sub-measurement window associated with the RTP metrics.

If optional IMEI TAC-based ML model is activated by SDMS policy configuration, during network data collection, SDMS continues operation when UE manufacturer or model information extracted from received IMEI (e.g., via RRC signaling by the base station and reported with the collected RTP and RF metrics) is contained within the deployed ML model. Otherwise, the SDMS can notify (e.g., via various mechanisms such as text based log exports, email etc) the administrator about the IMEI (TAC) information value not included in the deployed ML model.

Policy parameters of the SDMS can be configured by an administrator once SDMS is deployed with training, inference and TTI allocation configuration modifier subsystems. Configuration parameters include sub-measurement window duration (in ms), measurement window (e.g., in ms and in line with training reference file length MOS AQDL duration), threshold for data availability/quantity as minimum RTP packet count, and/or threshold for data availability/quantity as minimum RTP packet byte sum. The policy parameters can also include IE names for collection data (RTP metrics, RF radio metrics), UE identifier types (e.g., IP address(es), IMEI(s)), measures and thresholds for filtering/excluding input data (RF metrics and thresholds, EARFCNs), ML models deployed per AMR voice codec type and mode and optionally UE IMEI TAC, TTI allocation configuration related measures (TTI allocation periodicity, CCE consumption ratio) and associated thresholds (CCE consumption ratio threshold(s), MOS threshold(s), TTI allocation periodicity threshold(s) (e.g., maximum and/or minimum values)). The policy parameters can also include one or more base station(s) of interest.

In step 702, the real-time voice packet performance data is preprocessed to produce/provide the same type of input data (RTP metrics) that was used to train the ML model. The real-time voice packet performance data for UL, DL or both UL and DL can be preprocessed in the same manner as the field test is preprocessed in step 302. For example, the audio codec for real-time voice packet data can be determined using method 50. In addition, the RTP IPSfDV for DL and/or UL can be determined as described in Table 9.

TABLE 9

| IE Name | BS QCI1/5QI1 PDCP SDU level measurement point | BS RTP level measurement point |
|---|---|---|
| RTP DL IPSfDV | For each successfully sent QCI1/5QI PDCP SDU packet from the BS to the UE (except the first one) where [Absolute value of (a value of PDPCP SN associated with a QCI1/5QI1 PDCP SDU associated with a first RTP packet received from a network element associated with the BS) − (a value of PDCP SN associated with a QCI1/5QI1 PDCP SDU associated with a second RTP packet received from the network element associated with the BS) = 1] (as consecutive condition for two packets sent) RTP DL IPSfDV = absolute value of (F − 20 ms) where F = [Timestamp when last block of a QCI1/5QI1 PDCP SDU associated with the first RTP packet was successfully received by the UE according to BS received MAC HARQ positive acknowledgement − [Timestamp when last block of a QCI1/5QI1 PDCP SDU associated with the second RTP packet was successfully received by the UE according to BS received MAC HARQ positive acknowledgement] | For each successfully sent RTP packet from the BS to the UE (except the first one) where [Absolute value of (a value of PDPCP SN associated with a QCI1/5QI1 PDCP SDU associated with a first RTP packet received from a network element associated with the BS) − (a value of PDCP SN associated with a QCI1/5QI1 PDCP SDU associated with a second RTP packet received from network element associated with the BS) = 1] (as consecutive condition for two packets sent) RTP DL IPSfDV = absolute value of (E − F) where E = [A first RTP packet header source timestamp] − [A second RTP packet header source timestamp]/ [RTP packet source clock rate constant (i.e., 16 for Wideband mode, 8 for Narrowband mode) F = [Timestamp when last block of a QCI1/5QI1 PDCP SDU associated with the first RTP packet was successfully received by the UE according to BS received MAC HARQ positive acknowledgement − [Timestamp when last block of a QCI1/5QI1 PDCP SDU associated with the second RTP packet was successfully received by the UE according to BS received MAC HARQ positive acknowledgement] |

TABLE 9-continued

| IE Name | BS QCI1/5QI1 PDCP SDU level measurement point | BS RTP level measurement point |
|---|---|---|
| RTP UL IPSfDV | For each successfully received QCI1/5QI PDCP SDU packet by the BS from the UE (except the first one) where [Absolute value of (a value of PDPCP SN associated with a QCI1/5QI1 PDCP SDU associated with a first RTP packet received from the UE) − (a value of PDCP SN associated with a QCI1/5QI1 PDCP SDU associated with a second RTP packet received from the UE) = 1] (as consecutive condition for PDCP packets received) RTP UL IPSfDV = absolute value of (F − 20 ms) where F = [Timestamp when BS successfully received QCI1 PDCP PDU using RLC UM associated with the first RTP packet] − [Timestamp when BS successfully received QCI1 PDCP PDU using RLC UM associated with the second RTP packet] | For each successfully received RTP packet by the BS from the UE (except the first one) where [Absolute value of (a value of PDPCP SN associated with a QCI1/5QI1 PDCP SDU associated with a first RTP packet received from the UE) − (a value of PDCP SN associated with a QCI1/5QI1 PDCP SDU associated with a second RTP packet received from the UE) = 1] (as consecutive condition for PDCP packets received) RTP UL IPSfDV = absolute value of (E − F) where, E = [A first RTP packet header source timestamp] − [A second RTP packet header source timestamp]/[RTP packet source clock rate constant (i.e., 16 for Wideband mode, 8 for Narrowband mode) F = [Timestamp when BS successfully received RTP packet of/inside QCI1 PDCP SDU using RLC UM associated with the first RTP packet] − [Timestamp when BS successfully received RTP packet of/inside QCI1 PDCP SDU using RLC UM associated with the second RTP packet] |

One or more additional IEs in Table 10 can be determined. The additional IE(s) can be same IEs determined in step 302 (e.g., in Table 6).

TABLE 10

| IE Name | Description |
|---|---|
| RTP DL Packet SID | Count of RTP DL packet with only SID frames in payload This is a derived value using a prior knowledge on possible RTP DL Packet Speech length in bytes (RtpDlPacketSpeechLength) and measured values on RTP DL Byte (RtpDlByte) and RTP DL Packet (RtpDlPacket) |
| RTP UL Packet SID | Count of RTP UL packet with only SID frames in payload This is a derived value using a prior knowledge on possible RTP UL Packet Speech length in bytes (RtpUlPacketSpeechLength) and measured values on RTP UL Byte (RtpUlByte) and RTP UL Packet (RtpUlPacket) |
| RTP DL Packet Speech | Count of RTP DL packet with only speech frames in payload RTP DL Packet − RTP DL Packet SID |
| RTP UL Packet Speech | Count of RTP UL packet with only speech frames in payload RTP UL Packet − RTP UL Packet SID |
| RTP DL Byte Per Packet Speech | Average RTP DL bytes per packet where packet payload is speech only. |
| RTP UL Byte Per Packet Speech | Average RTP UL bytes per packet where packet payload is speech only. |

For each sub measurement window, RTP packet count and RTP byte sum can be analyzed to determine if a SID frame exists or not. If a SID frame exists, RTP inter packet delay variance measurement for that sub measurement window is tagged to be excluded during measurement window based IPDV calculations. Another scenario for tagging a sub measurement for IPDV is the case that at least one RTP packet loss exists during sub measurement window.

RTP packet count and RTP packet byte sum over all sub measurement windows are used to determine if collected data amount is enough for SDMS analysis. (e.g., RTP packet count>threshold1 and/or RTP packet byte sum>threshold2)

After SDMS analysis of RTP packet count, RTP byte sum and derived SID count, AMR voice codec mode is determined by comparing a table with a prior knowledge of possible RTP packet sizes carrying speech frames and the determined RTP byte per packet, for example according to method 50.

Derived AMR voice codec mode and reported UE manufacturer and model information (using IMEI TAC info extracted from UE IMEI) is stored together with aggregated/binned RTP and RF radio metrics over the collected sub measurements. This aggregation/binning is performed as various statistical operations such as averaging, median, maximum, statistical deviation calculations. An exception is applied during IPDV calculation where tagged values are excluded.

In option step 703, RF radio metrics may be used to apply a filtering operation over SDMS actions where collected data at measurement window level may be excluded if an associated RF metric threshold is not satisfied. (e.g. UE RSRP worse than −110 dBm and/or UE RSRQ worse than −12 dB etc.). Similarly, served (E)ARFCN metrics may also be used to apply filtering operation over SDMS actions so that measurements associated with a specific (E)ARFCN set is used during SDMS method.

There are three different options to extract UE-based RTP performance metrics from the data collected from the network where following measurements shall be configured or subscribed at the base station by SDMS and received by SDMS live network data collector:

(1) PDCP SDU level measurements for LTE. In this scenario, each PDCP SDU packet carries one RTP packet thus PDCP level packet count and packet loss measures may be an indication of RTP level packet count and packet loss measures. Additionally, because an RTP packet which is composed of an AMR frame and an RTP header is embodied in a PDCP SDU packet, an RTP packet byte sum may be determined by subtracting a UDP packet header byte sum and an IP packet header byte sum from a PDCP SDU byte sum.

(2) SDAP SDU level measurements for NR. In this scenario, each SDAP SDU packet carries one RTP packet thus SDAP level packet count and packet loss measures may be an indication of RTP level packet count and packet loss measures. Additionally, because an RTP packet which is composed of an AMR frame and an RTP header is embodied in an SDAP SDU packet, an RTP packet byte sum may be determined by subtracting a UDP packet header byte sum and an IP packet header byte sum from a SDAP SDU byte sum.

(3) RTP level measurements for LTE or NR. In this scenario, direct RTP level measurements (which may be expensive in terms of processing power of base station when the count of analyzed UEs increases) may be employed.

In step 704, the real-time voice packet data and/or the preprocessed real-time voice packet data is optionally filtered using UL and/or DL RF radio metrics for the UE(s) 130. For example, RF radio metrics may be used to apply a filtering operation over SDMS actions where collected data at measurement window level may be excluded if an associated RF metric threshold is not satisfied. (e.g. average UE RSRP worse than −110 dBm and/or average UE RSRQ worse than −12 dB etc.). Similarly, served E-UTRA Absolute Radio Frequency Channel Number (EARFCN) for LTE/New Radio Absolute Radio Frequency Channel Number (NR-ARFCN) for NR metrics may also be used to apply a filtering operation over SDMS actions so that measurements associated with a specific (E)ARFCN set is used during SDMS method.

For each measurement window (e.g. 6 s), the following data can be stored in online network database (e.g., data archive 140) for ML inference purposes: (1) RTP packet loss count, (2) RTP packet loss rate where denominator excludes derived SID frame count over all sub-measurement windows, (3) average/maximum RTP Inter packet delay variance where SID frame does not exist in any sub measurement window associated with measurement window (e.g., IPSfDV for UL and/or DL), (4) audio codec mode/type, and/or (5) UE manufacturer and/or UE model (e.g., IMEI TAC).

In step 705, a predicted MOS is determined for each measurement window using a trained ML model (e.g., the ML model trained in step 303). The data input to the trained ML model include the preprocessed real-time voice packet data (performance measurements) and/or the IEs determined in step 702. The inputs to the trained ML model can include RTP DL IPSfDV, RTP UL IPSfDV, RTP packet loss count (UL and/or DL), RTP packet loss rate (UL and/or DL), and/or AMR audio codec type/mode (UL and/or DL). The inputs to the trained ML model can also include the UE manufacturer and/or UE model. In some embodiments, steps 701-705 can be performed by SDMS inference module 110*b*.

In step 706 (via placeholder A), the SDMS 110 determines the CCE consumption ratio for the base station. The CCE consumption ratio is the ratio of current or historical average (average of current and previous values) consumption of CCE resources divided by the configured and available CCE resources in the base station.

The CCE consumption ratio can be directly determined by the base station and reported/sent as a performance metric (to the SDMS) where formula is given as consumed count of group of resource elements (e.g. 36 for LTE) for PDCCH (Physical Downlink Control Channel) divided by configured/available count of group of resource elements for PDCCH over an observation period (e.g. one or more seconds).

A CCE consumption ratio is a measure to define PDCCH resource granularity. A resource element is the smallest unit of the resource grid made up of one subcarrier in the frequency domain and one OFDM (Orthogonal Frequency Division Multiplexing) symbol in the time domain.

For LTE, a control-channel element includes or consists of 9 resource-element groups (REGs) where a resource-element group equals one third resource block (12RE/3=4 REs) during one OFDM symbol.

For NR, a control-channel element includes or consists of 6 REGs where a resource-element group equals one resource block (12 REs) during one OFDM symbol.

Some resource elements (with associated OFDM symbols) carry PDCCH, some carry other physical channel information defined under a control region over time and frequency resources of a communication between a UE and a base station. Amongst resource elements associated/reserved for PDCCH usage, the ratio of CCE PDCCH consumption is used to determine CCE consumption ratio. (e.g. for LTE, number of CCEs available for PDCCH can be calculated as A=Total Available RE s within control ofdm symbols defined by the value indicated by PCFICH, B-Number of REs used for reference signals, PHICH and PCFICH), then total number of CCEs available for PDCCH=C=(A−B)/36).

Control Channel Element (CCE) consumption ratio for the base station is determined by receiving from the base station produced performance metrics for PDCCH resource allocation. In addition to per UE performance metrics (RTP, RF), SDMS receives base station performance metric as CCE consumption ratio for PDCCH.

In step 707, the SDMS 110 modifies the transmission time interval (TTI) allocation periodicity configuration at the base station for the UE. Steps 706 and 707 can be performed by the SDMS TTI allocation configuration modifier module 110*c*.

Figure 8:
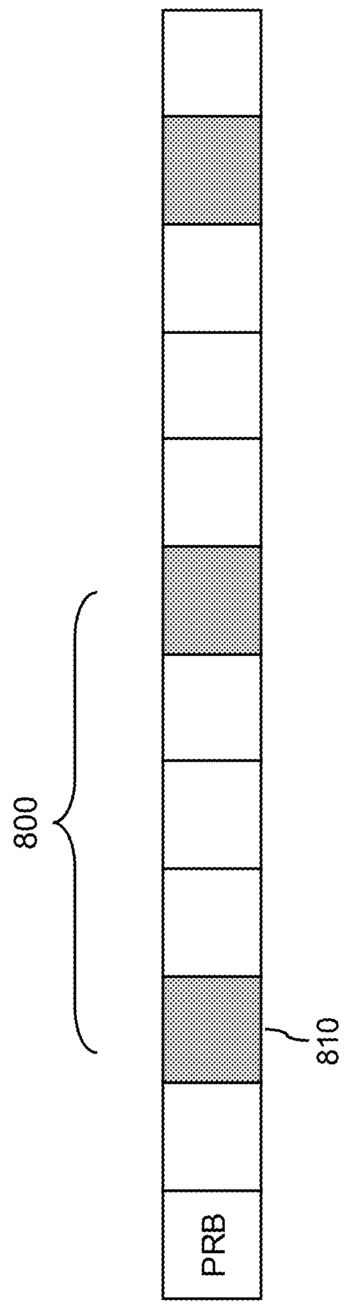
FIG. 8 is an example of a transmission time interval allocation periodicity.

The base station scheduler dynamically allocates a resource in both the frequency domain and the time domain where the technique is also known as OFDM. OFDM takes advantage of a large number of closely spaced orthogonal subcarriers. Each subcarrier is modulated with a conventional modulation scheme, such as QPSK or 16QAM where a specific modulation symbol is used to transfer an associated number of bits depending on various factors such as amount of data to transfer and radio conditions. A single subcarrier for one modulation symbol time period is referred to as Resource Element (RE). Transmission of data to/from the UE takes place during one Transmission Time Interval (TTI) as basic time unit (e.g., 1 ms for LTE and NR (SCS=15 khz)) for packet scheduling. Resource assignment includes physical resource blocks (PRBs) and the MCS used to transmit the data. In semi-persistent scheduling for voice data, TTI allocation can be assigned where the PRBs are assigned (e.g., reused) on a repeated basis with an assigned periodicity (e.g., from 1 ms to 40 ms). An example of a TTI allocation periodicity 800 of assigned PRBs 810 is illustrated in FIG. 8.

Time-frequency resources allocation (count of RB) or MCS (modulation and coding scheme (to use)) index is updated through PDCCH (Physical Downlink Control Channel) when there is data to send in the buffer (e.g., every 20 ms for a voice data radio bearer) when dynamic scheduling is used. A large portion of PDCCH resource (part of CCE capacity) is consumed during a voice call. In order to overcome this, semi-persistent scheduling is standardized for low bandwidth services like voice, where a base station allocates fixed resources (i.e., (P)RB count and MCS index) to the UE through a PDCCH order. PDCCH (and associated CCE capacity) is used only to activate and deactivate semi-persistent scheduling and send the (P) RB count and MCS index. (e.g., MCS index=15). In this way, PDCCH/CCE resource consumption is reduced but voice quality may be degraded due to two main reasons: (1) if there is a voice packet in the buffer and scheduling period is not yet active, data needs to wait, an increase in IPDV for voice packets occur; or (2) because no update to MCS index is done until deactivation, if radio and/mobility condition of user degrades (e.g., due to increased mobility and/or loss of signal strength or quality), HARQ (hybrid automatic repeat request) retransmissions may increase (in worst case packet discard due to retransmission maximum limit achieved or timeouts) causing additional increase in IPDV for voice packets. The SDMS 110 can receive the current TTI allocation periodicity for the UE 130 from the base station.

After the TTI allocation periodicity configuration is determined, the SDMS 110 dynamically causes the base station to modify TTI allocation periodicity configuration (for the UE 130 at the base station) so that the new TTI allocation periodicity configuration causes decreased CCE consumption ratio and decreased IPDV (e.g., IPSfDV) of a QCI1/5QI1 associated data radio bearer to improve end-user perceived speech quality. The SDMS 110 can include an SDMS TTI Allocation Configuration Modifier Engine that can cause the base station to modify the TTI allocation periodicity configuration for the UE 130. The TTI allocation configuration can be determined according to a table where the table provides a TTI allocation periodicity value for the determined CCE consumption ratio for the base station and the predicted MOS value for the UE. An example table of TTI allocation periodicity, CCE consumption ratio (percent) for the base station, and the predicted MOS for the UE is provided in Table 11. Other tables can be used in other embodiments.

TABLE 11

| Base Station CCE Consumption % | | Predicted MOS | TTI Allocation Periodicity |
|---|---|---|---|
| 0 | 75 | MOS < 3 | 1 ms |
| | | MOS ≥ 3 | 20 ms |
| 75 | 100 | MOS < 3 | 10 ms |
| | | MOS ≥ 3 | 40 ms |

A 1 ms TTI allocation periodicity is a dynamic scheduling state with an associated PDCCH/CCE consumption and voice quality. A 10 ms TTI allocation periodicity is a semi-persistent scheduling state with less PDCCH/CCE consumption and reduced voice quality for mobile users compared to 1 ms TTI allocation. A 20 ms TTI allocation is a semi-persistent scheduling state with less PDCCH/CCE consumption and reduced voice quality for mobile users compared to 10 ms TTI allocation. A 40 ms TTI allocation is a semi-persistent scheduling state with less PDCCH/CCE consumption and reduced voice quality for mobile users compared to 20 ms TTI allocation.

As can be seen in table 11, a threshold approach can be used with respect to predicted MOS and current base station CCE consumption ratio/percentage. When the predicted MOS is greater than or equal to a threshold value (e.g., 3), the TTI allocation periodicity can be configured to higher values (e.g., 20 ms) compared to when the predicted MOS is less than the threshold value (e.g., 1 ms). Similarly, when the predicted MOS is lower than the threshold value (e.g., 3), the TTI allocation periodicity can be configured to lower values (e.g., 1 ms) compared to when the predicted MOS is greater than or equal to the threshold value (e.g., 20 ms). When the base station CCE consumption ratio/percentage is less than a threshold (e.g., 75%), the TTI allocation periodicity can be configured to lower values with respect to corresponding predicted MOS (e.g., 1 ms) compared to when the base station CCE consumption ratio/percentage is greater than or equal to the threshold (e.g., 10 ms). When the base station CCE consumption ratio/percentage is greater than or equal to the threshold (e.g., 75%), the TTI allocation periodicity can be configured to higher values with respect to corresponding predicted MOS (e.g., 40 ms) compared to when the base station CCE consumption ratio/percentage is less than the threshold (e.g., 20 ms).

In sum, the SDMS can receive as inputs: UE voice related performance metrics (RTP, RF), UE IMEI (additionally or optionally), the base station CCE consumption ratio, the current TTI allocation periodicity for the UE (e.g., received from the base station). The SDMS can also receive and/or access the trained ML model, for example as an input or when processing the inputs to determine a predicted MOS. The SDMS can produce as outputs a predicted MOS and a new/updated TTI allocation periodicity for the UE. The new/updated TTI allocation periodicity can be sent to the base station directly or indirectly (e.g., to cause the base station to use) when it is different from the current TTI allocation periodicity for the UE.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A computer-implemented method for dynamically improving a quality of a cellular voice call, comprising:

receiving voice packet data associated with the cellular voice call that includes a cellular mobile device in cellular communication with a base station, the voice packet data including a plurality of voice packets and representing a measurement time window, the measurement time window subdivided into a plurality of sub-measurement windows;

determining an audio codec mode of the voice packet data and a number of silent indicator descriptor (SID) packets in the voice packet data based, at least in part, on an average packet length of voice packets in each sub-measurement window, a known length of SID frames in the voice packet data, and a set of predetermined packet lengths associated with a speech frame, each predetermined packet length corresponding to a respective known voice codec mode, each SID packet including at least one SID frame;

determining one or more real-time data metrics of SID-free packets in at least some of the sub-measurement windows, the SID-free packets only including speech frames with the number of SID packets equal to 0;

determining a predicted mean-opinion score (MOS) of the cellular voice call by feeding the real-time data metric (s) and the audio codec mode into a trained machine-learning model, the trained machine-learning model having been trained with known MOS values and known data metrics of test SID-free packets from test calls and known audio codec modes; and dynamically modifying a base-station configuration for the cellular mobile device to improve at least one of the real-time data metric(s) so as to improve an end-user perceived speech quality of the cellular voice call associated with the audio codec mode.

2. The method of claim 1, further comprising:

identifying one or more first packets in at least a first sub-measurement window in which a packet loss occurs; and determining one or more packet-loss metrics of the voice packet data based, at least in part, on the one or more first packets, the real-time data metric(s) including the packet-loss metric(s).

3. The method of claim 2, wherein the pack-loss metric includes a packet loss count and/or a packet-loss rate.

4. The method of claim 1, further comprising determining an inter-packet delay variance (IPDV) of the SID-free packets, the real-time data metric(s) including the IPDV.

5. The method of claim 1, further comprising:

determining a current control-channel element (CCE) consumption ratio for the base station; and dynamically modifying a transmission time interval (TTI) allocation periodicity configuration of the base station for the cellular mobile device based on the predicted MOS and the current CCE consumption ratio.

6. The method of claim 5, further comprising comparing the predicted MOS to a threshold value, wherein:

when the predicted MOS is greater than or equal to the threshold value, the TTI allocation periodicity is set to a higher value compared to when the predicted MOS is lower than the threshold value, and when the predicted MOS is lower than the threshold value, the TTI allocation periodicity is set to a lower value compared to when the predicted MOS is greater than or equal to the threshold value.

7. The method of claim 6, further comprising comparing the current CCE consumption ratio to a threshold value, wherein:

when the current CCE consumption ratio is greater than or equal to the threshold value, the TTI allocation periodicity is set to a higher value compared to when the current CCE consumption ratio is lower than the threshold value, and when the current CCE consumption ratio is lower than the threshold value, the TTI allocation periodicity is set to a lower value compared to when the current CCE consumption ratio is greater than or equal to the threshold value.

8. The method of claim 5, wherein the TTI allocation periodicity configuration is modified according to a look-up table that provides reference TTI allocation configurations as a function of reference current CCE consumption ratios and reference predicted MOS values.

9. The method of claim 1, further comprising:

receiving radio-frequency (RF) radio metric data for the cellular mobile device; and filtering the voice packet data using the RF radio metric data.

10. The method of claim 1, wherein the voice packet data is associated with a Quality-of-Service (QoS) Class Identifier 1 (QCI1) data radio bearer or a 5 QoS Identifier 1 (5QI1) data radio bearer of the cellular mobile device.

11. The method of claim 1, further comprising:

(a) determining the number of SID packets in a first sub-measurement window according to a formula:

$$\text{Packet } SID = \frac{(RPS \times RTP \text{ Packet}) - RTP \text{ Byte}}{RPS - 19}$$

where RPS is a first packet length of the set of predetermined packet lengths associated with the speech frame, and RTP Byte is a total number of bytes in the voice packets in the first sub-measurement window;

(b) determining if the number of SID packets in the first sub-measurement window is a positive integer; and (c) repeating steps (a) and (b) with a different packet length of the set of predetermined packet lengths associated with the speech frame until the number of SID packets in the first sub-measurement window is a positive integer.

12. The method of claim 1, wherein the voice packet data comprises real-time transport protocol (RTP) voice packet data.

13. A speech detriment management system (SDMS) comprising a non-transitory computer-readable medium comprising instructions that, when executed by a processor, cause the processor to:

receive voice packet data associated with the cellular voice call that includes a cellular mobile device in cellular communication with a base station, the voice packet data including a plurality of voice packets and representing a measurement time window, the measurement time window subdivided into a plurality of sub-measurement windows;

determine an audio codec mode of the voice packet data and a number of silent indicator descriptor (SID) packets in the voice packet data based, at least in part, on an average packet length of voice packets in each sub-measurement window, a known length of SID frames in the voice packet data, and a set of predetermined packet lengths associated with a speech frame, each predetermined packet length corresponding to a respective known voice codec mode, each SID packet including at least one SID frame;

determine one or more real-time data metrics of SID-free packets in at least some of the sub-measurement windows, the SID-free packets only including speech frames with the number of SID packets equal to 0;

determine a predicted mean-opinion score (MOS) of the cellular voice call by feeding the real-time data metric (s) and the audio codec mode into a trained machine-learning model, the trained machine-learning model having been trained with known MOS values and known data metrics of test SID-free packets from test calls and known audio codec modes; and dynamically modify a base-station configuration for the cellular mobile device to improve at least one of the real-time data metric(s) so as to improve an end-user perceived speech quality of the cellular voice call associated with the audio codec mode.

14. A non-transitory computer-readable medium comprising instructions that, when executed by a processor, cause the processor to:

receive voice packet data associated with the cellular voice call that includes a cellular mobile device in cellular communication with a base station, the voice packet data including a plurality of voice packets and representing a measurement time window, the measurement time window subdivided into a plurality of sub-measurement windows;

determine an audio codec mode of the voice packet data and a number of silent indicator descriptor (SID) packets in the voice packet data based, at least in part, on an average packet length of voice packets in each sub-measurement window, a known length of SID frames in the voice packet data, and a set of predetermined packet lengths associated with a speech frame, each predetermined packet length corresponding to a respective known voice codec mode, each SID packet including at least one SID frame;

determine one or more real-time data metrics of SID-free packets in at least some of the sub-measurement windows, the SID-free packets only including speech frames with the number of SID packets equal to 0;

determine a predicted mean-opinion score (MOS) of the cellular voice call by feeding the real-time data metric (s) and the audio codec mode into a trained machine-learning model, the trained machine-learning model having been trained with known MOS values and known data metrics of test SID-free packets from test calls and known audio codec modes; and dynamically modify a base-station configuration for the cellular mobile device to improve at least one of the real-time data metric(s) so as to improve an end-user perceived speech quality of the cellular voice call associated with the audio codec mode.

* * * * *